US012603563B2

(12) United States Patent　　　　(10) Patent No.:　US 12,603,563 B2

Knierim　　　　　　　　　　　　　　(45) Date of Patent:　　Apr. 14, 2026

(54) SUPERCONDUCTING MOTORS AND COMPONENTS THEREOF

(71) Applicant: Electric Mayhem, LLC, Littleton, CO (US)

(72) Inventor: Glenn Auld Knierim, Littleton, CO (US)

(73) Assignee: Electric Mayhem, LLC, Littleton, CO (US)

( * ) Notice: Subject to any disclaimer, the term of this patent is extended or adjusted under 35 U.S.C. 154(b) by 275 days.

(21) Appl. No.: 18/349,135

(22) Filed: Jul. 8, 2023

(65) Prior Publication Data

US 2024/0128847 A1　　Apr. 18, 2024

Related U.S. Application Data

(63) Continuation-in-part of application No. PCT/US2022/013662, filed on Jan. 25, 2022, which (Continued)

(51) Int. Cl.
　　*H02K 55/04*　　　　(2006.01)
　　*H02K 11/01*　　　　(2016.01)
(52) U.S. Cl.
　　CPC ............ *H02K 55/04* (2013.01); *H02K 11/012* (2020.08)
(58) Field of Classification Search
　　CPC ........ H02K 55/04; H02K 11/012; H02K 3/47; H02K 15/08; H02K 55/02; H01F 6/06; H01F 41/04; H01F 41/06
　　See application file for complete search history.

(56) References Cited

U.S. PATENT DOCUMENTS

| 2,671,495 A | 3/1954 | Iredell |
| 3,381,459 A | 5/1968 | Vawter |

(Continued)

FOREIGN PATENT DOCUMENTS

| CN | 103531303 | 1/2014 |
| DE | 4104087 | 8/1991 |

(Continued)

OTHER PUBLICATIONS

Gao et al., Design and Study of a 2G HTS Synchronous Motor with Brushless HTS Flux Pump Exciters. 5 Pages. Aug. 2019.

(Continued)

*Primary Examiner* — Christopher M Koehler
*Assistant Examiner* — Viswanathan Subramanian
(74) *Attorney, Agent, or Firm* — FisherBroyles, LLP; Craig W. Mueller

(57) ABSTRACT

An improved system for handling delicate linear media and in particular to a method and apparatus for winding delicate linear media such as superconducting wire or tape or optical fibers onto a spool or former, and electric machines produced thereby. A combination of direct closed loop control and media routing design facilitates the handling of the delicate media without causing damage. The axial tension in the linear media may be closely controlled during winding by means of feedback control loop using tension measurements to control the rotation speeds of the wind-from and wind-to spools. Further, during winding, the delicate linear media is only exposed to large radius bends with no reverse bending. Finally, output devices and features, commercial or otherwise, made possible by delicate linear media handling are revealed. This includes advanced SC devices and features.

40 Claims, 11 Drawing Sheets

Related U.S. Application Data is a continuation-in-part of application No. 17/159, 047, filed on Jan. 26, 2021, now Pat. No. 11,878,892.

(56) References Cited

U.S. PATENT DOCUMENTS

| | | | |
|---|---|---|---|
| 3,507,137 | A | 4/1970 | Taleff |
| 3,701,491 | A | 10/1972 | Brown |
| 3,833,184 | A | 9/1974 | Hara |
| 4,022,391 | A | 5/1977 | Stein |
| 4,347,993 | A | 9/1982 | Leonard |
| 4,407,062 | A | 10/1983 | Sutcliffe |
| 4,434,945 | A | 3/1984 | Hamane |
| 4,459,742 | A | 7/1984 | Banner |
| 4,463,547 | A | 8/1984 | Young |
| 4,484,586 | A | 11/1984 | McMickle |
| 4,546,656 | A | 10/1985 | Grundy |
| 4,548,085 | A | 10/1985 | Grundy |
| 4,665,952 | A | 5/1987 | Macemon |
| 4,671,465 | A | 6/1987 | Lemley |
| 4,683,919 | A | 8/1987 | Macemon |
| 4,699,184 | A | 10/1987 | Macemon |
| 4,750,960 | A | 6/1988 | Bubeck |
| 4,765,552 | A | 8/1988 | Sugioka |
| 4,771,961 | A | 9/1988 | Sugioka |
| 4,773,607 | A | 9/1988 | Missout |
| 4,885,494 | A | 12/1989 | Higashi |
| 4,928,894 | A | 5/1990 | Ohno |
| 5,145,052 | A | 9/1992 | Luciano |
| 5,315,189 | A | 5/1994 | Neff |
| 5,325,002 | A | 6/1994 | Rabinowitz et al. |
| 5,421,534 | A | 6/1995 | Ernst |
| 5,505,398 | A | 4/1996 | Emmerich |
| 5,551,144 | A | 9/1996 | Mantone |
| 5,623,189 | A | 4/1997 | Hemmer |
| 5,632,136 | A | 5/1997 | Luchenbill |
| 5,681,006 | A | 10/1997 | Gordon |
| 6,387,852 | B1 | 5/2002 | Celik |
| 6,395,080 | B1 | 5/2002 | Cass |
| 6,510,604 | B1 | 1/2003 | Pourrahimi |
| 6,595,454 | B2 | 7/2003 | Roba |
| 6,603,379 | B1 | 8/2003 | Manlief |
| 6,820,833 | B1 | 11/2004 | Carlsson |
| 6,991,144 | B2 | 1/2006 | Franz |
| 8,936,209 | B1 | 1/2015 | Knierim |
| 9,624,068 | B1 | 4/2017 | Knierim |
| 2002/0125787 | A1 | 9/2002 | Howard |
| 2002/0172891 | A1 | 11/2002 | Mori |
| 2002/0183208 | A1 | 12/2002 | Pereira |
| 2003/0115836 | A1 | 6/2003 | Suzuki |
| 2004/0040451 | A1 | 3/2004 | Peroni |
| 2004/0094656 | A1 | 5/2004 | Perry |
| 2004/0193303 | A1 | 9/2004 | Fore, Sr. |
| 2004/0206849 | A1 | 10/2004 | Harrington |
| 2004/0211851 | A1 | 10/2004 | Barton |
| 2004/0245365 | A1 | 12/2004 | Ramesh |
| 2005/0227873 | A1 | 10/2005 | Leghissa |
| 2006/0266794 | A1 | 11/2006 | Melfi |
| 2009/0118126 | A1 | 5/2009 | Burke et al. |
| 2009/0140451 | A1 | 6/2009 | Wampler |
| 2009/0183486 | A1 | 7/2009 | Beck |
| 2010/0319802 | A1 | 12/2010 | Hattori |
| 2012/0053060 | A1 | 3/2012 | Shinzato et al. |
| 2017/0236627 | A1 | 8/2017 | Walsh et al. |
| 2018/0251333 | A1 | 9/2018 | Knierim et al. |
| 2021/0006116 | A1 | 1/2021 | Gabrys et al. |
| 2021/0012929 | A1* | 1/2021 | Rey ........................ H01B 12/06 |

FOREIGN PATENT DOCUMENTS

| | | |
|---|---|---|
| DE | 102009009018 A1 | 9/2010 |
| DE | 102017102314 | 8/2018 |
| EP | 0519629 | 12/1992 |
| GB | 2043715 | 10/1980 |
| JP | H065416 | 1/1994 |
| KR | 20110085123 A | 1/2011 |
| WO | 2015123415 | 8/2015 |
| WO | 2022164787 A1 | 8/2022 |

OTHER PUBLICATIONS

International Search Report and Written Opinion from related PCT/US22/13662. Jun. 2022. 19 pages.

Extended European Search Report dated Apr. 26, 2019 associated with corresponding EP16849625.5. 13 pages.

International Search Report and Written Opinion for PCT/US2016/053174.

Office Action from related Korean Patent Application No. 10-2023-7028914. Jul. 11, 2025. 7 pages.

European Office Action dated Sep. 2, 2025 associated with corresponding EP22746459. 9 pages.

* cited by examiner

504

508

1180

1183

1100

1189    1187    1190

1186

1185

1188    1182

1181

1750

1754

1767

1794

1786

1790

1770

1766

1774

1778

1782

1810
B''
1802
1808
1812
B'
1800
B
Air Gap
1806

1758
1759

1765

1762
1760
1764

SUPERCONDUCTING MOTORS AND COMPONENTS THEREOF

This application is a Continuation-in-Part of PCT Application Serial No. PCT/US22/13622, published as WO2017053611, filed Jan. 25, 2022, which claims the benefit of U.S. patent application Ser. No. 17/159,047, filed Jan. 26, 2021, published as U.S. Patent Application Publication No. 2021/0229946, which is a continuation-in-part of U.S. patent application Ser. No. 15/927,877, filed Mar. 21, 2018, now U.S. Pat. No. 10,899,575, issued Jan. 26, 2021, which is a continuation-in-part of PCT/US2016/053174, filed Sep. 22, 2016, and published as WO2017/053611 on Mar. 30, 2017, the entire disclosures of which are incorporated by reference herein. PCT/US2016/053174 claims the benefit of U.S. Provisional Patent Application Ser. Nos. 62/221,910, filed Sep. 22, 2015, U.S. Provisional Patent Application Ser. No. 62/242,393, filed Oct. 16, 2015, and U.S. Provisional Patent Application Ser. No. 62/243,966, filed Oct. 20, 2015, entitled the entire disclosures of which are incorporated by reference herein.

This application is related to U.S. patent application Ser. No. 14/569,314, filed Dec. 12, 2014, now U.S. Pat. No. 9,624,068, issued Apr. 18, 2017, which is a continuation-in-part of U.S. patent application Ser. No. 13/269,549, filed Oct. 7, 2011, now U.S. Pat. No. 8,936,209, issued Jan. 20, 2015, which is a continuation-in-part of U.S. patent application Ser. No. 13/114,012, filed May 23, 2011, which claims the benefit of U.S. Provisional Patent Application Ser. No. 61/347,374, filed May 21, 2010, the entire disclosures of which are incorporated by reference herein.

FIELD OF THE INVENTION

Embodiments of the present invention are generally related to devices and apparatus that handle and manipulate delicate linear media, particularly to an apparatus and method for winding linear media such as superconducting linear media. Other embodiments of the present invention are the output of this apparatus, particularly products and devices made from winding superconductors into magnets, cables, and/or cable magnets.

BACKGROUND OF THE INVENTION

Superconductors (sometimes referred to herein as "SC") have the promise of bringing pure efficiency (i.e., 100% efficiency), which would allow for the manufacture of innovative devices that can accommodate increased energy and power requirements in a compact package and through HTS use provide for lessened cryogenic requirements via LN2 use. Current commercially-available advanced SC products, such as magnets, cables, and cable magnets, are virtually non-existent because superconductors, including those that can tolerate higher temperatures, are fragile. Accordingly, the winding process must consider the fragile SC media during handling, winding, and final operation.

HTS machines are desired across industries from individual device to enabling electric system solutions. Conventional copper (Cu) and permanent magnet (PM) machines are limited by air gap magnetic flux density (B), torque, thermal, and power output. Cu cooling needs are also great and add to system weight. Conventional machines use iron (Fe) to increase their air gap B but at the expense of weight. An HTS direct drive machine has no thermal loss and over 6× a conventional machine torque limit due to the B output.

The air gap is the non-magnetic space between the primary and secondary of any electromagnetic device.

After decades no HTS or MTS device, including electric machines (particularly motors & generator), have moved beyond laboratory-based demonstration levels. Due to winding limitations, other HTS winding machine attempts focus on making a pancake stack machine field coil with only limited protection from HTS winding and operational stress. Pancake stacks increase harmonic content, move the coils further from the air gap, which lowers the air gap B, and thus cannot be used for complex winds such as armature coils. Further, pancake stacks are not curved to protect the HTS tape from quenching due to high B locations. There have been no attempts to create a fully HTS via a fully cold, cryogenically cooled on both the armature and rotor, machine due to the difficulty in winding HTS armature coils, which leads to a machine that gains less than half of SC operational benefits. Other MTS solutions have lower material cost but when reacted are even more fragile and have a higher cryostat cost and complexity given a lower operating temperature and potentially more dangerous cryogen.

Those of ordinary skill in the art will appreciate that manufacturing for HTS applications requires complex geometric materials to experience low winding stress which in turn allows increased operating values. This requirement is exacerbated when manufacturing complex geometric magnets categorized by their primary mounting and rotation needs, which include solenoid (often mounted on a common central turning platform), planar (such as a racetrack coil or a curved plane cos-theta magnet and often mounted on cylindrical tooling), and spherical (such as a baseball or yin-yang magnets). Advances in HTS operational values, their performance, the reliability of cryogenic systems, connections, etc., and the understanding that HTS material costs drop during production have collectively targeted SC manufacturing as the remaining issue for commercial SC applications.

SUMMARY OF THE INVENTION

It is one aspect of embodiments to provide a revolutionary manufacturing method for producing high temperature superconducting (HTS) and medium temperature superconducting (MTS) commercial applications and devices across all relevant industries, including enabling fieldable superconducting devices and enabling electric systems that are not possible without being able to use HTS. The disclosed manufacturing process reduces stress, allowing complex magnet, cable, and cable magnet configurations. For example, the method of one embodiment produces a robust magnet configuration configured for use in the first fully cold (liquid cryogen) HTS linear, rotary, curved, etc. electric machine (motor/generator). This contemplated method also may allow for the manufacture of a reliable and robust power-dense HTS cable core operating from DC to transient, including AC and pulsed power with negligible reactance and acceptable power loss compared to existing practice. The cable, magnet, cable core, cable magnet, etc. produced by the methods described herein are designed to function at liquid nitrogen (LN2) temperatures using existing HTS. Accordingly, the disclosed magnet, cable, and cable magnet superconductor winding capabilities disclosed herein allow for the most power-dense, specific power, energy-dense, and specific energy electrical and magnet-based products ever created, especially embodiments that utilize HTS.

The winding machines of some embodiments of the present invention provide the ability to directly monitor and actively control the location, tension, and bend of every conductor and insulator being used to create the magnet, cable, and/or cable magnet at every moment of production. This aspect is often key to generating the optimum magnet, cable, and/or cable magnet from fragile media. The use of sensors and control algorithms are also often key to the most complex part of the disclosed winding solution. Independent but electronically geared active control for each conductor and insulation winding spool for a single product provides the functionality required.

Degrees of Freedom (DoF) Controls. As used herein, the term "DoF" will be used to describe the control of the routing elements and structures to adjust the orientation of the elements and structures to provide linear and/or rotational degrees of freedom to facilitate the handling of the delicate media without causing damage.

It is thus one embodiment of the present invention to provide a winding machine that may be capable of twenty DoF, comprising: a frame having an upper portion and a base portion; a wind-off spool subassembly, comprising: a first linear actuator interconnected to the base, a first rotary actuator interconnected to the first linear actuator, a second linear actuator interconnected to the first rotary linear actuator, a wind-off frame interconnected to the second linear actuator, and a rotatable wind-off spool, which is adapted to carry linear media, operatively interconnected to the wind-off frame; a follower subassembly, comprising: a third linear actuator interconnected to a cross member of the upper portion of the frame, the third linear actuator being substantially oriented with the first linear actuator, a second rotary actuator interconnected to the third linear actuator, a plate interconnected to the second rotary actuator, at least one riser interconnected to the plate, at least one beam interconnected to at least one riser, a tensiometer operatively associated with the at least one beam, a transverse beam interconnected to at least one beam and spaced from the tensiometer, a turning fork rotatably interconnected to the transverse beam, the turning fork ending in parallel guides adapted to receive the linear matter, a fourth linear actuator interconnected to a frame member associated with the plate, wherein the fourth linear actuator is configured to urge a first arm in a direction non-parallel to the third linear actuator, a fifth linear actuator interconnected to a frame member associated with the plate, wherein the fifth linear actuator is configured to urge a second arm in a direction non-parallel to the third linear actuator, a sixth linear actuator interconnected to the fourth linear actuator, wherein the sixth linear actuator is configured to urge a third arm in a direction orthogonal to the fourth linear actuator, a seventh linear actuator interconnected to the fifth linear actuator, wherein the seventh linear actuator is configured to urge a fourth arm in a direction orthogonal to the fifth linear actuator, a third rotary actuator interconnected to the sixth linear actuator, a fourth rotary actuator interconnected to the seventh linear actuator, an eighth linear actuator interconnected to the third rotary actuator, wherein the eighth linear actuator is configured to urge a fifth arm in a direction towards the linear media, a ninth linear actuator interconnected to the fourth rotary actuator, wherein the ninth linear actuator is configured to urge a sixth arm in a direction towards the linear media, a first wind-on guide interconnected to an end of the fifth arm, and a second wind-on guide interconnected to an end of the sixth arm; a former subassembly, comprising: at least one tenth linear actuator interconnected to the base portion, at least one eleventh linear actuator interconnected to the base portion, a twelfth linear actuator interconnected to the tenth and twelfth linear actuators, a fifth rotary actuator interconnected to the twelfth linear actuator, a wind-on frame interconnected to the fifth rotary actuator, a sixth winding arc rotation interconnected to the fifth rotary actuator, and a wind-on spool operatively interconnected to the wind-on frame, the wind-on spool configured to rotate and adapted to receive the linear media; and wherein the linear media is taken from the wind-off spool, transitioned about the tensiometer, and wound onto the wind-on spool to form a magnet, and wherein the turning fork, the first wind-on guide, and the second wind-on guide along with selective movement of at least one of the first linear actuator, second linear actuator, third linear actuator, fourth linear actuator, fifth linear actuator, sixth linear actuator, seventh linear actuator, eighth linear actuator, ninth linear actuator, tenth linear actuator, eleventh linear actuator, twelfth linear actuator, first rotary actuator, second rotary actuator, third rotary actuator, fourth rotary actuator, fifth rotary actuator, or sixth winding arc rotation control the position of the linear media. The wind-on spool associated with a sixth rotary device at the spool location provides winding arc rotation, thereby allowing the wind-on spool to selectively tilt which include embodiments such as a goniometer or a rack and pinion arc mechanism.

Material Handling. It is yet another aspect of embodiments of the present invention to provide enhanced material handling capabilities. More specifically, current SC winding methods produce various stress/strain points that lead to material failure and lower critical SC values, which lowers operational performance. The stress/strain points will often survive winding and subsequent quality assurance processes but will lead to failure during the worst-case scenario of the highest system power or energy operation.

Tensioner and Guide. It is another aspect of some embodiments of the present invention to provide a linear media tensioner and guide. More specifically, the LMHS may manual or automatically guide and hold tension for both wind-off and wind-on portions of the cable, magnet, or cable magnet wind while allowing individual SC operations, such as SC critical value testing, splicing operations, and wind-off spool swapping, to occur.

Winding Arc Rotation. Automated and/or manual rotation of the wind-on former allowing a key wind-on DoF ability. The purpose is to allow simple to very complex magnet, cable, and cable magnet wind abilities equivalent to human wind interaction and to a level not possible with other semi to fully automated winding machines. Embodiments include a goniometer or rack and pinion arc mechanized system such as for a complex solenoid, planar, and/or spherical magnet wind.

No Reverse Bends Linear Media Routing Design. Some embodiments of the present invention use a routing design that follows strict design rules in transferring linear media from a storage/reacting, wind-off spool to the desired wind-on spool (or bobbin or former). It is highly desirable that the media routing path, particularly HTS and reacted MTS, have no reverse bends whatsoever.

Bend Radius Control. As media is routed through the winding machine, it is also highly preferable that each bend, including wind-off and wind-on spools and any pulleys over which media passes, should maintain a minimum bend radius. This minimum radius, which can also be expressed as a minimum radius of curvature, is determined by the nature of the media material being processed.

Dynamic Surfaces. To minimize media stress and strain through friction and rubbing, which not only increases axial tension on the media but also tends to damage any wire insulation, all of the surfaces touched by the wire during the winding process will preferably provide a dynamic routing surface moving in the direction of the media motion (i.e., pulleys or wheels) or low friction surfaces with no sharp edges.

Direct Closed Loop Axial Control. According to some embodiments of the present invention, axial tension is measured and used as input data for the primary control loop affecting system operation. Preferably, closed-loop control is used whereby the winding process is initiated by motors that turn either the wind-off spool or the wind-on spool (or both).

Direct Closed Loop Lateral Control. Lateral bending and stress should also be controlled in some embodiments of the present invention. Superconductor wire should unwind from the wind-off spool, pass around the tension sensor wheel (preferably wrapped around approximately 180 degrees circumferentially to ensure accurate measurement of the tension), and wind onto the wind-on spool while staying in substantially the same plane.

Lateral sensors at the wind-on guides are placed orthogonal, or close to it, to the wind-on direction. This sense guides the level of guide force on the media which is then compared to other sensors, such as machine vision, to adjust the controls.

Non-Contact Sensor. It is yet another aspect of the present invention to provide a non-contact precision sensors, such as machine vision including optical including 3D vision, laser including 3D laser profiling, and/or proximity sensors. For example, some LMHS embodiments employ a non-contact media position or wind pattern sensor system such as a vision or laser or a non-contact tension sense electromagnetic, resistance, or inductance measurement sensor from one to multiple sense directions.

Angle On/Off Wind. Active control loops based on the axial tension value as one embodiment of being the global control master and a hierarchy of master/slave relationships provide the means of varying the pitch angle and accurately keeping the desired performance such as constant axial tension.

End of Layer Sense. A critical transition in windings occurs when the edge of a wind-on spool is encountered. In multilayer windings, a change in direction must be negotiated at this transition.

Proof of Performance. Some embodiments of the present invention provide proof of post winding performance integrity. More specifically, values such as tension and dropout occurrences are recorded throughout each SC strand's length and, therefore, in the final cable and magnet.

Turn-by-Turn Tension Control. It is another aspect of some embodiments of the present invention to provide turn-by-turn tension control or by continually varying tension control throughout the wind-on process. For example, some LMHS allow the operator to set winding tension values for each layer and even each turn per layer in the wind.

Reverse Direction Wind. Winding operation onto a bobbin commonly involves a single bobbin rotation direction. It is another aspect of some embodiments of the present invention to provide an LMHS that performs a reverse direction wind onto a bobbin.

Splice Mitigation. LMHS of one embodiment provides the ability to lower the number of and, in some cases, remove splices required for any linear media such as SC wire or tape due to the large number of controllable degrees of freedom (DoF).

Cryostat Cladding and Cable Jacket. The LMHS of one embodiment of the present invention provides an inline cryostat cladding station, cable jacket station, etc. that facilitates the development of large commercial cable magnets and commercial power cables by completing the cable former core.

Integrated Wound Components. It is yet another aspect of some embodiments of the present invention to provide a winding machine configured to integrate energy storage system (ESS), power electronics, sensors, etc., into a cable, magnet, or cable magnet. The cable embodiment can wrapped for a finite, intermittent, or complete cable length and/or when used in a cryogen environment. One of skill in the art will appreciate that a common energy storage system that could be incorporated by winding into or onto or placed into or onto a cable, magnet, or cable magnet, for example, is an ultracapacitor (same as a supercapacitor), capacitor, battery, or similar device. Further, "power electronics" are understood to often be solid-state, non-solid-state, such as linear based, etc., electronics that selectively control and convert electric power. Sensors provide ESS, power electronics, cable, magnet, cable magnet, etc. sensing which can then be recorded and/or used in a controlled response. Integrated ESS, power electronics, sensors, etc., are lighter, smaller, and safer than a conventional ESS pack/box that employ ESS housings, busbars, nuts and bolts, etc. The ESS and power electronics may be wound separately or together as a combined solution at an automated and/or manual station.

One cable embodiment component is periodically wrapped around a cable core either in a spiral wrap process or formed into long strips to separately spiral wrap in one embodiment. In a further example, ultracapacitors (UCs) passively protect the remainder of the ESS, such as batteries, from stress that would otherwise require heavy and costly power electronics. This functionality provides a Distributed Grid solution, and for an electric aircraft embodiment, a Distributed Electric Propulsion (DEP) solution. In a separate or combined embodiment example, a wound battery will often be used to provide long-lasting energy to power capabilities and the UC will be used to provide peak power capabilities where either or both may include power electronics and sensors.

In one UC embodiment, cable wrapped chemical UCs are placed in a non-cryogen region. Another UC, e.g., nano-whiskers (nw), is placed in the cryogen resulting in a more efficient and thinner UC, allowing the transmission of AC/DC/pulsed power. Placing the UC into the cryogen removes the need to regularly break through the cryostat to connect the UC to the superconductor, which is important for thermal management and increased reliability. The cryogen will also provide added electromagnetic (EM) shielding external to the SC device. Further, cryogenic temperatures increase copper (Cu) electrodes' conductivity, further supporting a more efficient and thinner UC. Specifically, placing the UC into the cryogen should result in a lower equivalent series resistance (ESR), which improves a UCs ability to deliver large amounts of power as ESR is inversely proportional to peak power. Power electronics and sensor embodiments provide active sense and control of any elements wrapped onto the cables, magnets, and/or cable magnets contemplated herein.

Adjustable Winding Guides. Adjustable Winding Guides, such as independent follower guides or wind-to guides, are utilized by some embodiments of the present invention to allow wind-on equivalent to a human operator. The contemplated guides provide an automated and/or manual ability to control the wound media. Wind-to guides can be low friction surfaces, rollers, rods, or guides located on one or multiple sides of the media in space. In one embodiment, wind-on guides are set to the linear media width and hold the media in place. The guides are either directly or via a separate pusher used for added side alignment force needs. In certain embodiments, the software can code a spline or equivalent from computer-aided design (CAD), computer-aided manu-facturing (CAM), or equivalent for multiple DoF to follow to create a more precise and winding contour. All adjustable winding guide embodiments can connect to any winding machine sensor and control to automatically control their motion. Human interaction via a control panel may also be used.

The guides are intended to provide a machine equivalent solution for human interaction to control delicate media. Accordingly, one benefit of some embodiments is that the media is properly handled. In addition, by providing machine-calculated variable tension control at some to all wind layup points, mechanical stress in the radial and angular direction is controlled. Using these techniques, system-neutral stress axis stress is also located, which can be leveraged to negate eventual operational stresses. Typically, a negative radial or inward wind stress is chosen, thereby reducing the entire wind stress from mechanical wound stress, such as magnet hoop and radial stress. Finally, more DoF provides a greater ability to actively minimize the stress and bends and achieve a more complex final geometry.

One embodiment is designed to fabricate a classic magnet armature wind or any angled, curved, or concave section wind. An added "push" is used for a zone equivalent to a human pusher tool. For applications that require a curved armature magnet, a single to multi-positioned pusher setup is employed on top of the linear media to hold media layers located in a contoured slot to achieve a curved stack instead of a linear pancake coil. In another process, optional axial tension is generated between the spool and bobbin/former to "pull" the media taught. In another embodiment, indepen-dent follower guide arms are used with multiple DoF such as linear and rotary motion of the follower providing motion relative to the former.

In another embodiment, one pusher could be configured to push one or both sides of the linear media with the proper tooling, whereas the other pusher could be used for other operations such as pushing down on the linear media to hold in place or wrap around a difficult corner.

In all embodiments, adjustable winding guides could help acquire a tighter packing factor and stop any wind fouling. Adjustable winding guides could also help control winding emplacement zones.

Air core devices. Those of ordinary skill in the art will appreciate that electric devices often employ an iron core, which produces high magnetic flux (B). Hybrid cores are also used but are not a good solution due to high B, which is far above iron (Fe) lamination saturation levels of ~0.6 to 1.1 T for costly laminations and associated losses. Further, Fe is heavy and brittle at cryogenic temperatures. Accord-ingly, it is another aspect of some embodiments of the present invention to provide a device that employs an air core instead of an iron core to address high B. Accordingly, such devices are lighter than traditional iron core devices, eliminate iron hysteresis loss, reduce circulating current losses, increase allowable primary and secondary coil wind-ing areas, provide a flexible structure for large and complex well installation, use the complete B path or magnetic energy, and possess lower total harmonic distortion emanat-ing from an associated electrical circuit. An air core design with no Fe B continuity needs means all magnets can be wound at once or into connectable sections when forming the final device.

Winding Sections. In a hybrid to air core design, particu-larly for superconductors, the necessity of using continuous iron to direct the magnetic flux density is removed which allows winding to assembly sections. Embodiments include any electrical winding such as electric machines, transform-ers, fault current limiters, NMR/MRI, and SMES. In the electric machine embodiment both the stator and rotor can then be built to wind, 3D print, or otherwise created and assemble in winding sections to connect when forming the final device. These sections are created external from the final device for winding and/or ease of assembly including providing line replaceable units and/or a means of activating TFMs outside of the final machine.

Multiple Wind Magnets. Wind multiple, separate magnets at once provides the ability to wind multiple magnets with no splice between magnets. Embodiments include multiple magnets such as multiple electric machine primary and/or secondary windings such as for the same phase. Other embodiments include concentric rings for the embodiments of a transformer or fault current limiter or SMES. Other embodiments include multiple cylindrical coils for use in high energy physics particle accelerators or NMR/MRI.

3D Printing of Superconducting Winding to Application Parts. It is one aspect to provide 3D print parts specific to superconducting, particularly HTS and MTS, application. That is, 3D print parts could be used in electric machines, MRIs and NMRs, regular to high-frequency transformers, fault current limiters, SMES, common to specialty magnetic device cores, winding formers and tooling, etc. Due to the extremely high superconductor current and magnetic field capable needs and benefits, use of 3D printing for final applications and products can be of extreme benefit, such as assisting the development and operation of fully cryogeni-cally cold and power-dense devices, rotary electric machines with high structural capability at high-speeds, thermal con-ductive paths, specialty materials such as Titanium (Ti) for SC use, and lower mass devices and systems. A linear, rotary, arc and all other electric machine embodiments include elements to complete electric machine rotor and stator to hold the field and armature windings including winding support to final operational formers, including hybrid to fully air core formers, as well as other magnetic elements such as trapped field magnet (TFM) and permanent magnets, as well as non-magnetic elements. Any magnet, cable, and/or cable magnet device includes 3D printing for magnetic paths, cryostats and cryogenic cooling and con-ductive paths, gas paths (e.g., cryogenic liquid to gas expan-sion paths), electromagnetic (EM) shields and shield mounts, supporting and controlling EM and mechanical effects such as via mechanical and/or electrical high-speed and frequency induced EM effects, conductive cooling and quench support, structural support, allows increased manu-facturability of components to systems, means of minimiz-ing part counts and cost, increasing reliability, etc.

3D printing a core improves manufacturability, reduces part count, reduces system size and weight, increases power density, allows for winding groups and high-speed force, allows for fully cold cryo-to-conductive cooling, and decreases cost. Due to compact sizing, titanium parts of one embodiment provides a lightweight and strong AC machine. Further, for such an electric machine, a 3D printed sectional rotor and stator, provides an evacuated air gap that removes windage and icing concerns. It is also contemplated that TFMs can be secured into 3D printed machined pockets. To achieve a strong magnet structure and remove voids for the complex 3D tape angle and placement, a vacuum impreg-nated epoxy design may be used for production magnets. 3D printed dove tails to hold field coils, for example, can be implemented for high rotor speeds, which also provides lowered stray loss from a smaller air gap. A core structure, such as air core, with cooling channels and set thermal links can be added to the structure.

All electric machine or similar inventions described herein apply to a rotary, linear, arc, etc. type of motional AC or DC device. In a rotary or arc electric machine the stator is the stationary part and the rotor is the moving part. A rotor is commonly the radially inside, but either can be on the radially inside or outside. Portions of this disclosure refer to "primary" and "secondary" portions of an electric machines. The "primary" is the location of the armature, which is commonly the stationary part of the electric machine, i.e., the component of an electric machine that carries AC current in an AC machine. The "secondary" is the active or passive moving component that responds to the primary of the electric machine. In an AC machine the secondary comprises magnetic field producing elements (magnetic coils, permanent magnets, trap field magnets, etc. or some combination) used in an AC synchronous machine and passive conductors used in an AC induction machine, which will be described in more detail below.

Winding HTS and MTS generally requires very large bend radii and the tensiometer (e.g., a tension measuring device) and tensiometer wheel that holds and senses the linear media must be large in diameter for HTS, and particularly reacted MTS, and well balanced in all directions to provide a part of a Newton level of tension continuous measurement. Such a wheel does not exist in industry.

Winding Injector. Some versions of the contemplated winding machine employ an automated and/or manual winding injector for placement of an adhesive, UV adhesive, thermal compound, spot, linear, pattern, etc. in the wind. In one embodiment, the winding injector is used for a concave, complex, or open on one or both ends wind. In another embodiment, the winding injector is used in conjunction with the follower guide(s) or pusher(s) to hold for a brief dry and then wind continuation or slow wind. Full transposition provides the option of an embodiment for better cooling paths which provides better quench and fault current protection where each layer thermally shields the layer below versus the more common Cu or equivalent thermal stabilizer usage. These cooling paths comprise HTS to HTS winding voids that accommodate wound-in thermally conductive material or injected cryogenics. In either case, voids could be wound in alignment to allow cryogen direct cooling to all layers. By orienting the internally wound thermally conductive material, the wound cooling paths can be connected to an outer conductive cooling path at repeated lengths down a cable, such as 0.5 meter contacts or a mesh contact, while allowing cryogen flow. In all cases the voids or any magnet, cable, cable magnet location can be epoxy or similarly filled also for other needs such as improved structural support, magnetic path support, etc.

Wind Form Filler. Another aspect of some embodiments of the present invention provides an LMHS that incorporates a wound former filler or bridge that prevents sharp bend points to occur in the wind-on material, particularly during flexure, operation, or other induced movement in a wound magnet, cable, cable magnet. Applied filler can be solid or liquid.

Magnet Station. One embodiment of the present invention provides an inline magnet and cable magnet station that facilitates the development of commercial magnets and cable magnets. This magnet station improves capability, reliability, cost, and production rate of complex magnet and cable magnet configurations while incorporating partial to full transposition and braiding of modern SC magnets and cable magnets. Embodiments of industry use include high energy physics (HEP), fusion, NMR/MRI, transformers, fault current limiters, superconducting energy storage rings (SMES), motor/generator magnets, and cable magnets.

Advanced Sense and Control. The LMHS of one embodiment employs advanced control processes, techniques, algorithms, and supporting sensor, type, placement, and use beyond what winding systems use to date. A primary embodiment is the uniquely developed and used axial tension sensor as a basis for all wind feed rates and tension control.

Variable Media. Reviewers of this application and the applications described above will appreciate that in some respects the media type being wound or transferred is not relevant. More specifically, the wound media can be any type of delicate material (e.g., superconducting wire, tape, cable, thermal to electrical insulation, etc.) wound or transferred from one location to another. Those of ordinary skill in the art will also recognize that the apparatus and methods described in these applications can be used to create cables, magnets, cable magnets, or any other device known in the art that incorporates wires or cables or linear media.

Superconducting Electric Machine of any Flux Type. It is yet another aspect of some embodiments of the present invention to provide radial, axial, transverse, and any other type of flux type device that employs HTS, wherein the motor's stator and/or rotor portions are cryogenically cooled. The transverse flux motor components can also be partial or half cold. In one contemplated AC induction machine a field coil side can be replaced with conductive material, such as short circuited, passive HTS tapes perhaps in the form of coils, a squirrel cage, or sheet equivalent.

One embodiment of the contemplated invention is an air core AC or DC superconducting machine with HTS EM armature coils and HTS EM and trapped field magnet (TFM) field poles, which maximizes rotational speed, removes all possible losses, provides the most efficient, power-dense, and specific power machine possible with today's technology. A fully HTS electric machine including complex curve multi-turn per layer HTS field and armature coils increases efficiency and power for the very low mass and volume, especially for a smaller sized machine electric machine, beyond any other currently possible within the same rotor velocity range.

Fully Cold HTS Device. It is one aspect of some embodiments of the present invention to provide a fully-cold electric device. As used herein, "fully cold" refers to both primary (e.g., stator for an electric machine) and secondary (e.g., rotor for an electric machine, being at LN2 temperatures. The temperature of the components can be maintained at SC temperatures by bathing the device in cryogen, providing cryogen channels or reservoirs integrated into the components, providing a cryogen reservoir in thermal communication with the components (see, PCT/US23/68945, which is incorporated in its entirety herein), etc. The contemplated fully cold device can be an electric machine (e.g., motor/generator) having superconductors (SC) incorporated into all components of the device, such as both the primary and secondary of an electromagnetic device such as an electric machine. One of ordinary skill in the art will appreciate that it is also possible to provide an electric machine with fully cold or cryogenic features but with a combination of SCs and conventional conductors. Alternatively, corresponding components can operate at different temperature regimes, wherein one component operates at conventional cryogenic temperatures, and the other component operates at fully or partially SC temperatures.

Fully cold HTS electric machine with curved HTS coil transformational benefits include: 1) highest efficiency (>99.0%); 2) highest power and power density; 3) lightest weight; 4) smallest size; 5) highest torque; 6) highest air gap B; 7) no internal heat generation; 8) no resistive losses (particularly beneficial for short axial length machines such as most circumferential machines); 9) safely wound HTS commercial production magnets; 10) first ever complex curve multi-turn per layer HTS field and armature coils; 11) fully cold machine; 12) TFMs incorporated with EM coils into the field poles; 13) TFM activation inside of the machine due to combined field and armature EM coil activation method; 14) least amount of conductor tape/wire required; and 15) manufacturing ease from winding to modular stockable/swappable subassemblies for all frame sizes. In this example, HTS primary losses are 85% removed. Machine performance increase is related to the number of magnets converted to HTS, starting with the removal of all magnet resistive losses.

Tape Curvature and Alignment for B Path. Complex wind and curve the linear media for the best B path operation which is especially important for HTS tapes. Iron, which controls the B path (including a normal B into the air gap), is absent in an air core device. Accordingly, a curved winding pattern is used to accommodate B path needs. Properly designed complex 3D shaped SC magnets allow compact and lighter sizing for high efficiency and B without exceeding HTS critical values. Multi-layer magnets, such as an electric machine field coil, incorporates radii at their corners to curve the B path and minimize placement of HTS in the highest B regions, like electric machine Fe tooth curves for limiting motor saturation. The highest HTS induced current occurs when the external B is perpendicular to the tape width, so in another unique design step, each HTS tape is placed and oriented to set the HTS width parallel to the highest B. When this configuration is not possible, such as certain armature configurations, HTS EM shields deflect the highest B from the tape width.

Flat Fan Magnetic Coil. The winding ability described herein turns the considered negatives of HTS tape geometry to an advantage. Flat Fan compact coil embodiments range from common EM-based devices to any EM specialty devices, such as radial, linear, arc, and circumferential electric machines (examples include a motor for an aircraft turbofan and a generator for a wind turbine), transformers, fault current limiters, superconducting energy storage rings (SMES), NMR/MRI, cable magnets, thrust tubes such as for exoatmospheric satellite ion propulsion, fusion reactors, and high energy physics particle accelerator beam compression/recompression and focusing to deflection magnets. For an electric machine embodiment, this increases electric machine performance far beyond any other machine attempt with an electrical machine as close to an ideal sinewave machine as current technology allows for a discrete, multi-turned winding. In an electric machine, any stator or rotor coils [both primary (armature) and secondary (field, passive secondary, etc.) coil sides] can assume the flat fan configuration and certain field pole configurations can include TFMs and the stator or rotor can be on the inside radius and either can include the armature or field coils.

An extremely high power, compact device of any type is also possible because HTS has no internal heat generation at any non-critical current level, excluding minute solder joint and EM transient conductor heating. No heat generation means there are no current thermal limits, no EM shielded winding cooling beyond cryo cool down, no parallel winds needed for internal current heating, etc. Given no large heat generation concerns, specialized complex HTS winding placement turns the very thin nature of HTS to an advantage, allowing a new "Flat Fan" coil to be built and placed into a new configuration. The flat fan coil uses a thin tape profile such as an HTS (often 0.1 mm with 1 micrometer for HTS) by placing the HTS tape width (often 2 to 12 mm) facing width along the straight length, like a shallow saddle coil that is densely packed and curved. B acts in a direction across the surface current, which is highest parallel to the longest length, so orienting the tape width perpendicular or close to perpendicular to the air gap gives the highest B across the air gap. Long wind depths are no longer required versus a single (pancake), double, or, as expected, at most only a few layers winding, also allowed with max. B into the airgap due to flux exclusion as the B travels from the furthest (e.g., outer) layer tapes to the airgap with the thin HTS maintaining their path. When compacted into a pancake coil that curves to the air gap, this configuration places the thickness of all armature and secondary coil turns at the surface next to the air gap with no layers moving the HTS away from the air gap but with 100's to 1000's of turns with all at high currents. This configuration maximizes the air gap B while minimizing losses. When superimposing the B for many parallel, discrete turns aligned together, an extremely high B is attained. The limit is then defined by the maximum B for each HTS tape group region where discrete B loops are separated across the circumference versus the superposition of many turns into a deep tooth for the embodiment of a common radial machine.

A Flat Fan HTS magnet design allows the removal to minimization of slots and harmonic losses with a small air gap and support for magnetic and mechanical forces, main issues with slotless winds. The HTS provided high air gap B allows an air core machine which, along with no PM use, removes all hysteretic losses. An evacuated or non-air air gap removes all windage loss. Cryogenic cooling loss is equivalent to conventional cooling loss. A slotless armature allows a high rpm, removal of slot losses, construction ease, and good armature back plane cooling, including removing the need to separate coil turns and coil groups for cooling purposes. The armature phases and field coils can then be placed next to one another, with or without a phase-to-phase HTS shielding layer, and then structurally bind all HTS phases into single armature and/or field coil rings. Without slots and only shallow surface coils, the diameter, the best machine dimension to decrease for sizing and weight reduction needs, is minimized with only structural support and cooling beyond the radially outermost coils.

Secondary coils such as field coils follow a similar structure of winding to thermal support as the armature. If operations including a quench do not structurally or thermally allow a slotless wind, then short, thin teeth or equivalent can also be incorporated. Harmonics are minimized in this highly distributed armature and secondary wind with each turn (of possibly 100's of turns for a small sized electric rotary, linear, arc, etc. machine and only increasing for larger sized machines) next to the air gap providing a slight B electromotive force (emf) step versus slot generated emf from concentrated windings with most turns far from the air gap. A coil is then a compact series of either vertical or angled HTS turns. In the individual HTS angle case each turn can be wound to partially overlap one another to further remove harmonics, further decrease any unwanted induced B in the tape width while providing the highest air gap B, and this V-pattern assists with creating coil end turns by always rotating the HTS thickness side into the turn. For this case the HTS of the armature and/or secondary coil halves are angled into an overlapping V-pattern with respect to the B path. The contemplated angle may be slight due to the aspect ratio common to HTS-long length and relatively thin width.

The armature phase half turns in one embodiment turn inwards with respect to the secondary to accommodate the secondary B moving past the armature. To provide the highest induced B in the secondary, the secondary turns are expected to turn inwards with respect to the secondary pole to accommodate any B moving past the pole. The addition of a skew angle is also possible. A fractional pitch wind can further remove any harmonics remaining. Without harmonics, mostly due to the highly distributed wind, all non-leakage B goes into the power producing fundamental frequency and thus greatly approximates a pure sinusoidal machine.

If the stray B is minimized, critical HTS current is not approached, and if the B across the tape width is acceptable, then any tape width desired can be used for either the armature or field coils embodiment. For a high current machine, larger HTS widths provide a higher current output with a faster response time. On the lower end, smaller HTS widths allow many ampere-turns for a multi-layer coil or a high power, highly compact HTS single layer machine. Electrically, more turns give a higher emf with a natural current filter where HTS is already a high current output. More layers provide a higher power density within B and current critical limits.

Flat Fan End Turns. Conventional device end turns often experience leakage flux and Cu loss due to no back-iron and geometries that move the end turns away from the air gap and not orthogonal to the secondary. To use end turns as part of the magnetic length, orient end turns in an electric machine where poles can overlap end turns on one or both sides making them part of the magnetic length due to: 1) the flat, fan geometry of the HTS end turns; 2) the short end turns air gap; 3) 45-degree or smaller end turn angle with respect to the straight armature length; and 4) no end turn resistive losses. Mainly for an air core and compact and/or short axial machine where the end turns are a large axial length percentage, this adds power density and efficiency by increasing useable axial length and removing leakage inductance for the end turns and nearby straight magnetic length. If the phase power is not smooth due to no phase transition region such as chording, phase overlaps, enough inductive lag, end turn magnet lengths smooth phase power by automatically overlapping.

Curved Flat Fan Coils and TFMs. In one electric machine embodiment, the field coils are common coils or flat fan with multi-dimensional curved sides to control the B path and further accommodate trapped field magnets (TFM), such as but not limited to HTS TFMs, to further increase the air gap B and output performance. The TFMs can be activated into different pole orientations, which is of great benefit for changing the output from the same electric machine without having to rebuild the electric machine such as changing out the secondary. In a further electric machine embodiment of an HTS electric machine, the EM coil outsides curve to enclose all TFMs while maximizing the B for a small air gap pole area that overlaps multiple armature phases. The HTS EM field pole: 1) activates the TFMs in the machine; 2) maximizes the field B; 3) augments and controls the B for a higher and more efficient fundamental B for each rpm; and 4) waveform shapes power generation when in a self-excitation mode with the armature. Because the TFM B forms the shape of an equilateral triangle with the maximum at the puck middle surface, in one embodiment TFMs are placed side to side facing and angled with the air gap to provide the maximum averaged air gap B. The entire pole is then curved to decrease the curved air gap to allow the highest B without quench while providing a variable air gap length at each pole end to further lower harmonics. Field coil TFMs are epoxied into place, which protects the TFM and for ease of rotor manufacturing. Sensors and heaters placed with the TFMs control deactivation. Rotor poles are connected to form a cylinder for structural support.

TFM activation in a conventional or half HTS EM wound machine is a large concern due to the limitations of Cu winds and the maximum B they can hold across the TFM as well as Fe limitations. This concern is removed for a superconducting, such as HTS and MTS, EM due to the high B with no heat generation and further with hybrid to air core benefits. In one embodiment, TFM activation is achieved by aligning the field pole to a specific armature phase location and applying a same direction DC B across both the armature and field HTS coils.

AC losses are a known concern, particularly for the outer coil turns because all inner turns are magnetic flux density (B) non-orthogonal component HTS shielded. The slotless flat fan employed by some of the electric machines described herein greatly reduces AC losses for multiple reasons. In addition, slotless fans lower the non-useable inductance area. Further, HTS has large AC magnetization losses due to the high aspect ratio when the B is perpendicular to the HTS width. The common method of electrically isolated filaments to lower AC losses is not possible with HTS. Flat fan best approximates such electrically isolated filaments and lowers AC losses by N number of tapes for 1 width. A slotless wind also has no outer turns loss and meets the desire to locate B as normal as possible across the air gap. As B enters the flat fan HTS width, only a tangential B across the HTS width remains due to flux exclusion leading to lower AC losses and a normal air gap B. For wider tapes and/or more layers, flat fan provides a higher power and lower AC loss ratio. Finally, allowing B across each HTS tape width increases B penetration compared to a radial layered wind, also lowering AC losses.

EM Shields. In an electric machine embodiment, electromagnetic (EM) shields of an SC such as HTS or conventional conductor and the option to cryogen cool, both options allowing a high conductivity which greatly increases the EM shielding, are employed over the field poles, between armature phases, and over non-magnetic length end turns. These unique EM shield windings, with HTS being one embodiment: 1) lower quench issues; 2) support a higher B in a tight and contained path, especially in smaller magnets; 3) lowers mass by removing Fe and HTS turn needs; 4) optimize efficiency by minimizing stray and hysteretic B loss while allowing more current per HTS strand. For an embodiment of an armature magnetic length and end turn EM shielding, one to multiple single strips of parallel HTS with possibly soldered ends is used. In the armature length, the HTS strips and/or amortisseur bars are placed between the phases. End turns will use shorted HTS strip EM shields between phases to protect against high frequency losses such as power conditioning system (PCS) switching, a larger concern when resistance is removed. In some embodiments, a field pole EM shield for armature transients is required to minimize transient EM losses. In such cases if a field cryostat is required, then the stainless steel or aluminum or titanium or equivalent conductive metal cryostat wall will be considered for the EM shield, or shorted HTS strips are placed over the field poles. Due to the high conductivities and skin depth of all metals at cryogenic temperature, any high frequency metal EM shield is very thin. Cryogenic cooling paths for all EM shields can provide an excellent inductively generated heat removal mechanism.

Induction SC Electric Machine. Use wound secondary SC coils and/or squirrel cage configuration to obtain an high induced B and/or use HTS, such as many turns stacked or similarly in parallel, to provide an induced current path for starting torques and/or oscillation damping. An SC machine does not have the inherent resistive damping of a conventional machine which can lead to rotor oscillations. Embodiments to remove damping include embedding Cu or aluminum (Al) amortisseur bars, variable external resistors, and/or the power electronics drive where any listed device can include cryogen cooling to increase performance. These solutions also help control the speed/torque characteristics of an induction machine. For example, wound secondary motors with equivalent poles as the armature can be started with the highest torque and a low inrush current by inserting high resistance into the rotor circuit. As the motor accelerates, the secondary resistance can be decreased, coils shorted at maximum speed, to maintain maximum power. In all operational modes the benefits of an SC are achieved due to the extremely high induced emf. An embodiment is an HTS flat flan wound secondary with LN2 cooled damping bars between the winds and a potential skew opposite the armature coil or in place of an armature skew achieves a high performance output.

Combined Induction and Synchronous SC Electric Machine. A fully HTS electric machine with no resistance losses, high currents, and a high number of turns in a small packing factor has the benefit of combining the two AC machine types, induction and synchronous. Operate the same electrical machine as an induction, secondary is an induced passive B, or synchronous, secondary is active B, machine. This allows an extreme coupled B for both inductance and synchronous machine modes and hence high power and efficiency across all speeds. This HTS machine embodiment has a higher HTS cost and machine to power conditioning system (PCS) control complexity, but the benefits from this first ever machine can be critical for certain applications from industrial to electric vehicles (EV). An HTS wound induction solution provides a high self-starting torque to torque frequency range and efficiency due to the high induced currents with no loss. High starting torques and higher efficiency and power across speed ranges allow better total lifetime cost (TLC) for high torque motion and start/stop EVs (off-road construction, buses, aircraft ascent, and tugboats). An HTS synchronous solution allows extreme efficiency and power at optimal speeds where the secondary B is varied to maximize torque at the desired speed. Optionally, TFMs can be incorporated and activated for synchronous mode to greatly increase the power and/or close circuit the secondary in a passive mode with respect to external circuitry else do not activate the TFMs for inductive mode operation.

EV, which include aircraft operating with AC, employ low voltage systems for safety. Due to cooling issues at low air pressures and humidities, conventional conductors experience higher-than-expected losses at high currents. Low voltage systems also experience dielectric degradation and power-derated operation. The contained environment of a cryogen system removes both the high voltage (V) and current (I) AC issues. For ground vehicles, higher torque across the speed range, including down to starting torque, requires more current and less voltage, which is optimal for a superconducting motor. Comparatively, an AC is a high velocity, low torque system, especially once in flight.

Small motors have limited room for poles which affects their capabilities such as: 1) lowered speed from a lower number of poles for the entire electric machine; 2) lowered torque due to the amount of current carrying conductors that fit into a pole area; 3) lowered efficiency due to the minimized room for cooling and ability to aim the B towards the air gap. The induction and synchronous SC motor/generator of one embodiment employs high current and a power factor (pf) provided by a flat fan provides a high B and torque density even in a small motor with a small pole area from a high number of poles. This provides a smaller, lighter electric machine with a high power across the torque speed curve, which increases AC reliability by allowing distributed electric propulsion (DEP) with many times motor redundancy. If a quench, etc. occurs derating the current, then high amounts of HTS stabilizer not only quench protects the HTS but if electrically insulated then the contemplated SC motor/generator can still operate derated for AC if the system enters a higher voltage and lowered current mode. A higher number of poles assists with this high voltage operation. Such an operation also provides a more reliable AC system.

Combined Induction and Synchronous SC Electric Machine Mode and Operation Damping. Secondary coils are shorted for an induction machine response and coils are active with or without TFMs or permanent magnets (PM) for a synchronous machine response. Precise control is required to achieve the optimal torque-velocity when moving between induction (for variable speeds and/or slower speeds with higher torques) and synchronous (for optimized constant speeds) modes. An induction machine mirrors the armature poles, so in one embodiment a wound induction secondary can go into a common induction machine mode with external resistances or shorted coils or move into a synchronous mode by DC powering different pole configurations as set via connections for different pole numbers. The synchronous poles of choice are DC powered to lock from an inductive slip into a synchronous mode with limited hunting oscillations. An SC machine does not have the inherent resistive damping of a conventional machine which can lead to rotor oscillations. In another embodiment the external resistors including conductive cryo cooling are an extra rotor damping option but are not expected to be required due to the extreme air gap B stiffness and damping versus typically far lower motor output power pull leaving only high frequency, low power oscillations that the HTS and HTS coating should accommodate. Another embodiment includes variable pole options for how rotor based persistent switches close as passive inductive or active field coils.

Compact Advanced Superconducting Devices. It is another aspect of some embodiments of the present invention to provide advanced, compact devices made of superconductors. The superconductors may be made or processed using the techniques described herein. Contemplated compact SC devices include but are not limited to: motor and generator machines, magnetic resonance imagining (MRI), nuclear magnetic resonance (NMR), surface NMR (SNMR) [which includes surface MRI (SMRI) in this document], fault current limiters (FCL), and any device that includes or uses a high EM field and/or current partly to fully created by an advanced SC. Advanced SCs contain materials that allow superconducting operation at higher temperatures and are generally more to significantly more mechanically fragile. The disclosed devices can be used for motors and generators, medical applications, geoscience applications, wind energy generators, hydro-electric generators, hybrid or all-electric vehicles, oil and gas applications, magnetic containment, high energy physics (HEP) and fusion applications, including high B magnets, greater than 16 Tesla (T) magnets, power systems, aeronautical and aerospace applications, EM propulsion (magprop), EM levitation (maglev), space EM shielding, ship systems, ground transportation, military, utility, agricultural, construction, mining, environmental, resource management, disaster relief, archeology, and any industry using an EM system. Although some of the instant disclosure is focused on compact systems, those of skill in the art will appreciate SC devices of any size can be manufactured.

Compact Superconducting Device. The compact advanced SC of one embodiment is a high output and/or resolution device compact in size and weight. Some compact SC devices may be personnel portable employing power, energy storage, controls, data acquisition (DAQ), operator interface, and cryogenic systems.

Component Based Superconducting Device. Another embodiment of the invention includes the SC magnet set and other elements being swappable components or line replaceable units (LRUs).

Hybrid Superconducting Magnetics. The magnetics include hybrid embodiments with conventional electromagnet (EM) conductors and/or permanent magnets to complete wound SC and/or bulk TFM type SC. Embodiments include using magnetics of one type of source, such controlled and wound SC, to control and shape the magnetics of another type of source, such as a TFM or permanent magnet, whether part of the same magnet or pole or not.

Combined Superconducting Magnetics and Speed. Another embodiment of the invention is the combination of increasing speed of a partial to complete SC device to further increase energy density and specific energy while not losing efficiency due to speed induced transient losses. In an electric machine embodiment, maximizing B with a fully HTS device and high (5,000 rpm and above) to extreme speeds (10,000 rpm and above) supports highest power and size savings, leading to an ultra-high power and compact size through improved specific power/energy and power/energy density.

Superconducting Magnetic Prime Mover Power System Approach. The magnetic prime mover power system focus is atypical for an SC machine. Large scale efficiency and performance increase for any electrical machine is commonly achieved through the energy system means of increased relative motion of the magnetic reference frame, for example, the armature and exciter field coil in a synchronous motor and/or generator machine, and/or by maximizing the magnetic air gap magnetic flux density (B) for a particular operational temperature (T). This energy system approach is the future of SC machines once SC materials allow further increases. This common approach is not the direct focus of this embodiment. Instead, this embodiment incorporates a power system approach from the benefits of increased current density (J) from a system mindset.

Magprop. The winding to application descriptions herein, such as all electric machine descriptions, as applied to electromagnetic propulsion (magprop) including the embodiment of an HTS and MTS applied to any and all SC linear or curved electric machines of any type for terrestrial to extraterrestrial use including magnetic levitation (maglev) train propulsion and vehicle launchers including space launch systems.

Superconducting Inertial Propulsion. The winding to application descriptions herein, such as all electric machine descriptions, as applied to electromagnetic inertial propulsion including the embodiment of an HTS and MTS applied to any and all SC inertial propulsion of any type for terrestrial to extraterrestrial, including space, use including ion propulsion systems.

Maglev. The winding to application descriptions herein, such as all electric machine descriptions, as applied to magnetic levitation (maglev) including the embodiment of an HTS and MTS applied to any and all SC linear curved electric machines of any type for terrestrial to extraterrestrial use including magnetic levitation (maglev) train levitation and vehicle launchers including space launch systems.

Superconducting Transformer. The winding to application descriptions herein as applied to a transformer including the embodiment of an HTS and MTS regular to high frequency transformer. One embodiment of such a transformer may include a 3D printed core to support more advanced needs such as high frequency switching operations.

Superconducting Fault Current Limiters. The winding to application descriptions herein as applied to a superconducting fault current limiters (FCL) including the embodiment of an HTS and MTS regular to high transient and power FCL.

Superconducting Magnetic Energy Storage. The winding to application descriptions herein as applied to superconducting magnetic energy storage (SMES) including the embodiment of an HTS and MTS SMES.

Superconducting Flywheel Energy Storage. The winding to application descriptions herein as applied to a superconducting flywheel energy storage including the embodiment of an HTS and MTS regular to high speed and power flywheel.

Superconducting High Field Magnets. The winding to application descriptions herein as applied to superconducting high field magnets including the embodiment of an HTS and MTS high field magnets for high energy physics (HEP) and fusion applications greater than three Tesla (T) magnets.

Superconducting Space EM Shielding. The winding to application descriptions herein as applied to superconducting electromagnetic (EM) shielding magnets including the embodiment of HTS and MTS EM shielding magnets.

It is thus one aspect of embodiments of the present invention an electric machine, comprising: a primary component comprising at least one coil; and a secondary component having at least one coil formed of a layer of superconducting tape having a rectangular cross section, the secondary component positioned adjacent to the primary component and separated from the primary component by an air gap, the primary component configured to create an electromagnetic force that interacts with the secondary component to move the secondary component.

It is another aspect of some embodiments of the present invention to provide an electric machine, comprising: a primary component comprising at least one coil; a secondary component having at least one coil formed of a layer of superconducting tape having a rectangular cross section, the secondary component positioned adjacent to the primary component and separated from the primary component by an air gap, the primary component configured to create an electromagnetic force that interacts with the secondary component to move the secondary component; and wherein the rectangular cross section is defined by a long edge and a short edge, the short edge positioned adjacent to the air gap, and wherein the long edge is associated with lateral side surfaces of the superconducting tape that extends away from the air gap.

It is another aspect of some embodiments of the present invention to provide an electric machine, comprising: a primary component comprising at least one coil; a secondary component having at least one coil formed of a layer of superconducting tape having a rectangular cross section, the secondary component positioned adjacent to the primary component and separated from the primary component by an air gap, the primary component configured to create an electromagnetic force that interacts with the secondary component to move the secondary component; wherein the rectangular cross section is defined by a long edge and a short edge, the short edge positioned adjacent to the air gap, and wherein the long edge is associated with lateral side surfaces of the superconducting tape that extends away from the air gap, and wherein the lateral side surfaces are not normal to the curvature of the air gap.

It is yet another aspect of some embodiments of the present invention to provide an electric machine, comprising: a primary component comprising at least one coil; a secondary component having at least one coil formed of a layer of superconducting tape having a rectangular cross section, the secondary component positioned adjacent to the primary component and separated from the primary component by an air gap, the primary component configured to create an electromagnetic force that interacts with the secondary component to move the secondary component; and wherein the at least one coil of the primary component is comprised of a layer of superconducting tape having a rectangular profile.

It is still yet another aspect of some embodiments of the present invention to provide an electric machine, comprising: a primary component comprising at least one coil; a secondary component having at least one coil formed of a layer of superconducting tape having a rectangular cross section, the secondary component positioned adjacent to the primary component and separated from the primary component by an air gap, the primary component configured to create an electromagnetic force that interacts with the secondary component to move the secondary component; wherein the at least one coil of the primary component is comprised of a layer of superconducting tape having a rectangular profile; and wherein the layers of superconducting tape of the primary or secondary component are comprised of a plurality of magnets wound together with a continuous connection of wire or tape.

It is another aspect of some embodiments of the present invention to provide an electric machine, comprising: a primary component comprising at least one coil; a secondary component having at least one coil formed of a layer of superconducting tape having a rectangular cross section, the secondary component positioned adjacent to the primary component and separated from the primary component by an air gap, the primary component configured to create an electromagnetic force that interacts with the secondary component to move the secondary component; wherein the at least one coil of the primary component is comprised of a layer of superconducting tape having a rectangular profile; and wherein the rectangular cross section is defined by a long edge and a short edge, the short edge positioned adjacent to the air gap, and wherein the long edge is associated with lateral side surfaces of the superconducting tape that extends away from the air gap.

It is another aspect of some embodiments of the present invention to provide an electric machine, comprising: a primary component comprising a plurality superconducting coils a secondary component positioned adjacent to the primary component, the secondary component separated from the primary component by an air gap, the primary component configured to create an electromagnetic force that interacts with the secondary component to move the secondary component; and wherein the superconducting coils are formed of a layer of superconducting tape having a rectangular cross section.

It is another aspect of some embodiments of the present invention to provide an electric machine, comprising: a primary component comprising a plurality superconducting coils a secondary component positioned adjacent to the primary component, the secondary component separated from the primary component by an air gap, the primary component configured to create an electromagnetic force that interacts with the secondary component to move the secondary component; wherein the superconducting coils are formed of a layer of superconducting tape having a rectangular cross section; and wherein the rectangular cross section is defined by a long edge and a short edge, the short edge positioned adjacent to the air gap, and wherein the long edge is associated with lateral side surfaces of the superconducting tape that extends away from the air gap.

It is yet another aspect of some embodiments of the present invention to provide a method of controlling an electric machine comprising a primary component and a secondary component separated from the primary component by an air gap, the secondary component comprising a superconducting coil formed of a layer of superconducting tape having a rectangular cross section, comprising: initially energizing the primary component to create a magnetic field that interacts with the superconducting coil to begin rotation of the secondary component; and energizing the at least one superconducting coil to selectively alter the rotation of the secondary component.

It is yet another aspect of some embodiments of the present invention to provide a method of controlling an electric machine comprising a primary component and a secondary component separated from the primary component by an air gap, the secondary component comprising a superconducting coil formed of a layer of superconducting tape having a rectangular cross section, comprising: initially energizing the primary component to create a magnetic field that interacts with the superconducting coil to begin rotation of the secondary component; energizing the at least one superconducting coil to selectively alter the rotation of the secondary component; and wherein the secondary component further comprises at least one of a conductor of a coil or bar, superconducting tape, a permanent magnet, and a trapped field magnet.

It is another aspect of some embodiments of the present invention to provide a method of controlling an electric machine comprising a primary component and a secondary component separated from the primary component by an air gap, the secondary component comprising a superconducting coil formed of a layer of superconducting tape having a rectangular cross section, comprising: initially energizing the primary component to create a magnetic field that interacts with the superconducting coil to begin rotation of the secondary component; energizing the at least one superconducting coil to selectively alter the rotation of the secondary component; and wherein energizing the superconducting coil occurs when the rotation speed of the secondary component approaches a predetermined rate.

It is another aspect of some embodiments of the present invention to provide a method of controlling an electric machine comprising a primary component and a secondary component separated from the primary component by an air gap, the secondary component comprising a superconducting coil formed of a layer of superconducting tape having a rectangular cross section, comprising: initially energizing the primary component to create a magnetic field that interacts with the superconducting coil to begin rotation of the secondary component; energizing the at least one superconducting coil to selectively alter the rotation of the secondary component; and wherein the rectangular cross section is defined by a long edge and a short edge, the short edge positioned adjacent to the air gap, and wherein the long edge is associated with lateral side surfaces of the superconducting tape that extend away from the air gap.

It is another aspect of some embodiments of the present invention to provide a method of controlling an electric machine comprising a primary component and a secondary component separated from the primary component by an air gap, the secondary component comprising a superconducting coil formed of a layer of superconducting tape having a rectangular cross section, comprising: initially energizing the primary component to create a magnetic field that interacts with the superconducting coil to begin rotation of the secondary component; energizing the at least one superconducting coil to selectively alter the rotation of the secondary component; and wherein the superconducting coil of the secondary component has a passive mode of use and an active mode of use where current passes therethrough, and wherein the superconducting coil is in the passive mode of use when the primary component is initially energized.

It is another aspect of some embodiments of the present invention to provide a winding machine that may be capable of twenty DoF, comprising: a frame having an upper portion and a base portion; a wind-off spool subassembly, comprising: a first linear actuator interconnected to the base, a first rotary actuator interconnected to the first linear actuator, a second linear actuator interconnected to the first rotary linear actuator, a wind-off frame interconnected to the second linear actuator, and a rotatable wind-off spool, which is adapted to carry linear media, operatively interconnected to the wind-off frame; a follower subassembly, comprising: a third linear actuator interconnected to a cross member of the upper portion of the frame, the third linear actuator being substantially oriented with the first linear actuator, a second rotary actuator interconnected to the third linear actuator, a plate interconnected to the second rotary actuator, at least one riser interconnected to the plate, at least one beam interconnected to at least one riser, a tensiometer operatively associated with the at least one beam, a transverse beam interconnected to at least one beam and spaced from the tensiometer, a turning fork rotatably interconnected to the transverse beam, the turning fork ending in parallel guides adapted to receive the linear matter, a fourth linear actuator interconnected to a frame member associated with the plate, wherein the fourth linear actuator is configured to urge a first arm in a direction non-parallel to the third linear actuator, a fifth linear actuator interconnected to a frame member associated with the plate, wherein the fifth linear actuator is configured to urge a second arm in a direction non-parallel to the third linear actuator, a sixth linear actuator interconnected to the fourth linear actuator, wherein the sixth linear actuator is configured to urge a third arm in a direction orthogonal to the fourth linear actuator, a seventh linear actuator interconnected to the fifth linear actuator, wherein the seventh linear actuator is configured to urge a fourth arm in a direction orthogonal to the fifth linear actuator, a third rotary actuator interconnected to the sixth linear actuator, a fourth rotary actuator interconnected to the seventh linear actuator, an eighth linear actuator interconnected to the third rotary actuator, wherein the eighth linear actuator is configured to urge a fifth arm in a direction towards the linear media, a ninth linear actuator interconnected to the fourth rotary actuator, wherein the ninth linear actuator is configured to urge a sixth arm in a direction towards the linear media, a first wind-on guide interconnected to an end of the fifth arm, and a second wind-on guide interconnected to an end of the sixth arm; a former subassembly, comprising: at least one tenth linear actuator interconnected to the base portion, at least one eleventh linear actuator interconnected to the base portion, a twelfth linear actuator interconnected to the tenth and twelfth linear actuators, a fifth rotary actuator interconnected to the twelfth linear actuator, a wind-on frame interconnected to the fifth rotary actuator, a sixth winding arc rotation interconnected to the fifth rotary actuator, and a wind-on spool operatively interconnected to the wind-on frame, the wind-on spool configured to rotate and adapted to receive the linear media; and wherein the linear media is taken from the wind-off spool, transitioned about the tensiometer, and wound onto the wind-on spool to form a magnet, and wherein the turning fork, the first wind-on guide, and the second wind-on guide along with selective movement of at least one of the first linear actuator, second linear actuator, third linear actuator, fourth linear actuator, fifth linear actuator, sixth linear actuator, seventh linear actuator, eighth linear actuator, ninth linear actuator, tenth linear actuator, eleventh linear actuator, twelfth linear actuator, first rotary actuator, second rotary actuator, third rotary actuator, fourth rotary actuator, fifth rotary actuator, or sixth winding arc rotation control the position of the linear media. The wind-on spool associated with a sixth rotary device at the spool location provides winding arc rotation, thereby allowing the wind-on spool to selectively tilt which include embodiments such as a goniometer or a rack and pinion arc mechanism.

It is yet another aspect of some embodiments to provide a winding machine, comprising: a wind-off spool adapted to carry linear media; a wind-on spool adapted to receive the linear media; a follower subassembly positioned between the wind-off spool and the wind-on spool, comprising: at least one actuator associated with at least one wind-on guide subassembly, the at least one actuator configured to selectively impart lateral motion, transverse motion, or a combination thereof relative to the wind-on spool onto the at least one wind-on guide subassembly, the at least one wind-on guide subassembly comprising: a rotary guide actuator, a linear guide actuator operably interconnected to the rotary guide actuator, a wind-on guide operably interconnected to the linear guide actuator, wherein the linear guide actuator provides at least selective movement of an end of the wind-on guide towards or away from the wind-on spool, wherein the rotary guide actuator provides selective arcuate translation of the end of the wind-on guide; and wherein the linear media is taken from the wind-off spool and wound onto the wind-on spool to form a magnet, cable, or cable magnet, and wherein selective movement of the linear guide actuator or the rotary guide actuator controls the position of the linear media as it is placed on the wind-on spool.

It is still yet another aspect of some embodiments to provide a winding machine for use with linear media, comprising: a linear media supply spool adapted to store the linear media and from which linear media is removed; a cable core, magnet, or cable magnet associated with a wind-off spool; at least one motor that translates the cable core, magnet, or cable magnet, thereby transferring the cable core, magnet, or cable magnet onto a wind-on spool, a wrapping station configured to wrap linear media strands from the linear media supply spool onto the cable core, magnet, or cable magnet; and a component integration station that adds a component to the cable core, magnet, or cable magnet before, during, or after the cable core, magnet, or cable magnet is wound onto the wind-on spool or a former.

The Summary of the Invention is neither intended nor should it be construed as being representative of the full extent and scope of the present invention. That is, these and other aspects and advantages will be apparent from the disclosure of the invention(s) described herein. Further, the above-described embodiments, aspects, objectives, and configurations are neither complete nor exhaustive. As will be appreciated, other embodiments of the invention are possible using, alone or in combination, one or more of the features set forth above or described below. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present invention are possible utilizing, alone or in combination, as set forth above and/or described in the accompanying figures and/or in the description herein below.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

Unless otherwise indicated, all numbers expressing quantities, dimensions, conditions, and so forth used in the specification and drawing figures are to be understood as being approximations which may be modified in all instances as required for a particular application of the novel assembly and method described herein.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description and in the appended drawing figures.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

Figure 1:
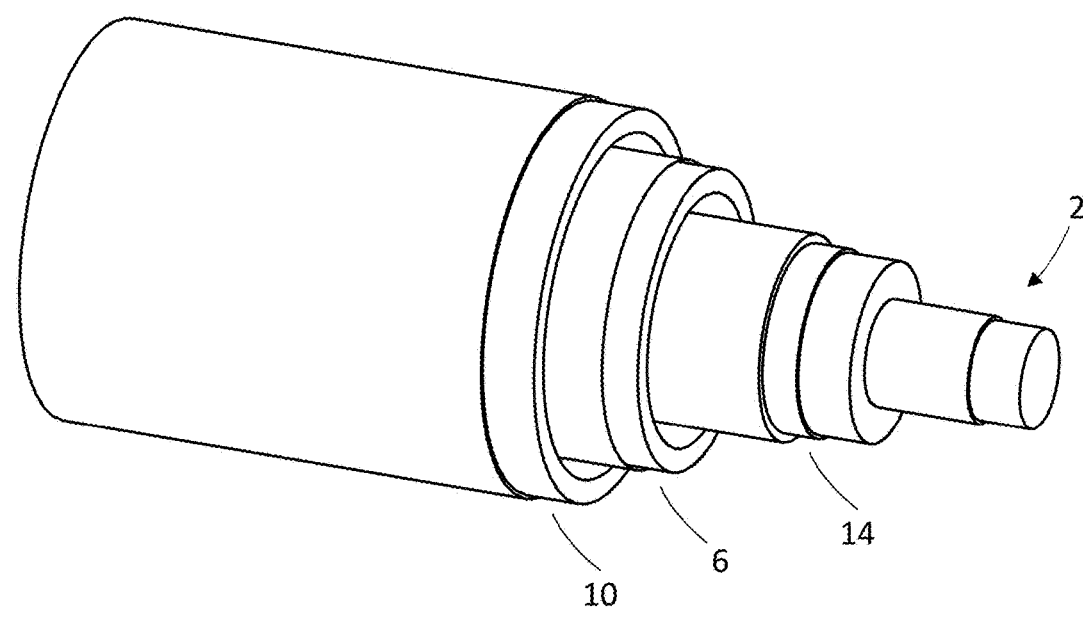
FIG. 1 is a perspective view of a solid core SC cable of one embodiment of the present invention showing the internal components thereof.

The following component list and associated numbering found in the drawings is provided to assist in the understanding of one embodiment of the present invention:

| # | Component |
|---|---|
| 2 | Cable core |
| 6 | Cladding and insulation |
| 10 | Jacket and outer wall |

-continued

| # | Component |
|---|-----------|
| 14 | Superconducting material |
| 20 | Cable |
| 24 | HTS Layer |
| 28 | Conductive stabilizer and insulating layer |
| 32 | Cryogen path (hollow core) |
| 36 | Cryogen path |
| 504 | Magnets |
| 508 | Connecting wire/tape between magnets |
| 1100 | Motor/generator |
| 1180 | Housing |
| 1181 | Stator |
| 1182 | Rotor |
| 1183 | Non-metal shaft portion |
| 1185 | Stator coils |
| 1186 | Hollow shaft |
| 1187 | Field pole |
| 1188 | Field coil |
| 1189 | Cover with EM shield |
| 1190 | Permanent magnets |
| 1300 | Magnet winding machine |
| 1304 | Frame |
| 1308 | Wind-off subassembly |
| 1312 | Follower subassembly |
| 1316 | Wind-on subassembly |
| 1318 | Base |
| 1320 | Linear media |
| 1324 | Wind-off spool |
| 1328 | Tensiometer |
| 1332 | Wind-on spool/former |
| 1340 | Frame |
| 1344 | Linear actuator |
| 1348 | Rotary actuator |
| 1352 | Stationary linear actuator |
| 1356 | Stationary linear actuator |
| 1360 | Crossbeams |
| 1364 | Rotary actuator |
| 1368 | Mounting/rotating plate |
| 1372 | Riser |
| 1376 | Beam |
| 1380 | Support beam |
| 1384 | Linear actuator |
| 1388 | Follower wind-on guides |
| 1390 | Wind-on point |
| 1394 | Stationary linear actuators |
| 1402 | Linear actuator |
| 1406 | Rotary actuator |
| 1410 | Rotating former frame |
| 1412 | Goniometer |
| 1750 | Electric machine |
| 1754 | Air core |
| 1758 | Armature flat fan end turn |
| 1759 | Armature flat fan coil |
| 1760 | Magnetic coil |
| 1762 | Magnetic coil end turns |
| 1764 | Secondary flat fan coil |
| 1765 | Secondary flat fan coil end turn bend |
| 1766 | Field poles |
| 1767 | Rotor |
| 1770 | Field pole spacer |
| 1774 | Trapped field magnets |
| 1778 | Field coils |
| 1782 | Reservoir |
| 1786 | Hollow shaft |
| 1790 | Non-metal shaft portion |
| 1794 | Rotor hollow portion |
| 1800 | HTS Tape Member |
| 1802 | Superconducting material |
| 1806 | Air gap |
| 1808 | Gap |
| 1810 | Second layer |
| 1812 | First layer |

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Embodiments of the present invention are directed to a Linear Media Handling System (LMHS) (one example of which is shown in FIGS. 13-18). The contemplated LMHS my include a partial to fully automated inline cryostat station allowing the entire LMHS to be deployed into the field for continuous length use similar as the splicing concept described herein. A primary example is using LMHS for cable production at the cable installation site. In this example one or more LMHS developed SC cables can be wound to include any desired cable twisting or weaving by using a further embodiment of LMHS placed downline in the SC cable winding system, and then inserting or cladding into a cable cryogen container or cryostat inline, which is then fed into the installation. FIG. 1 shows a cable with cable core 2 where cryostat cladding and insulation 6 and jacker and outer wall of 10 are placed around the superconductor core 14. One of ordinary skill in the art will appreciate that EM shielding can be located outside the superconductor and insulation. In some embodiments, power elements are inserted into areas 6 and 14 such as the Integrated Wound Component of a spiral wrapped ultracapacitor as a nano-whisker form of energy storage system embodiment.

Figure 2:
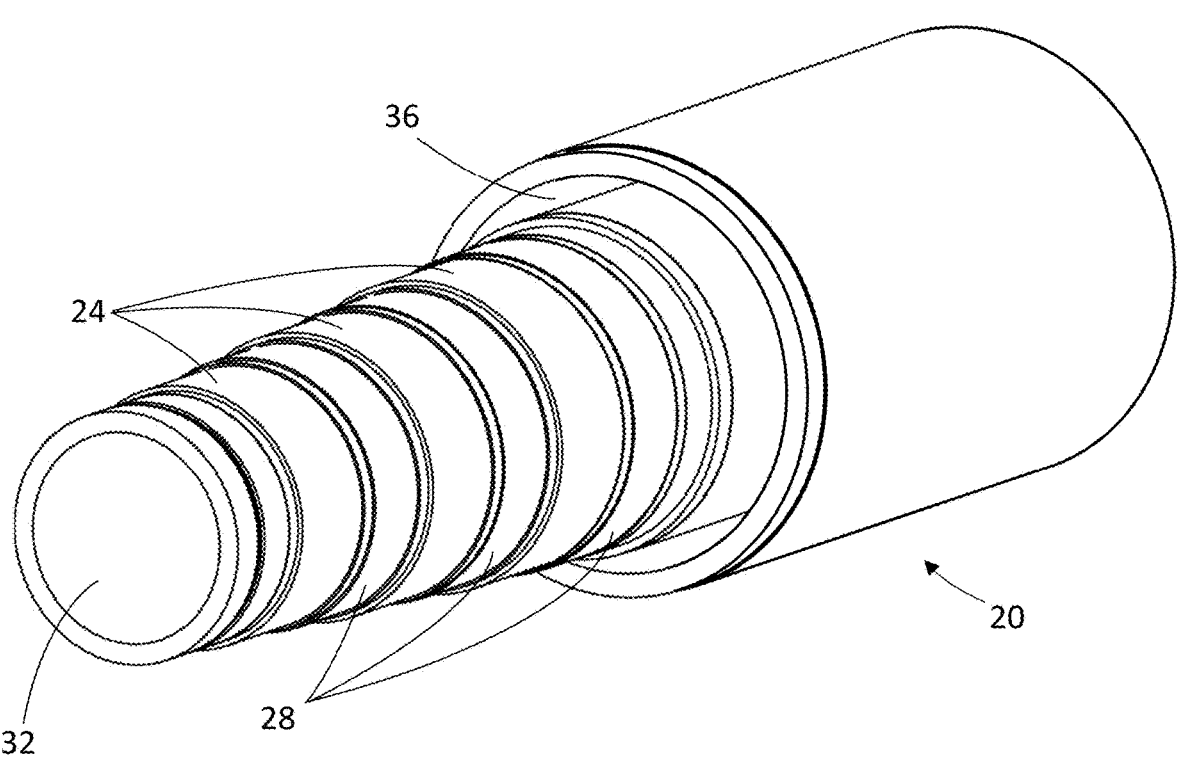
FIG. 2 is a perspective view of a hollow core SC cable of one embodiment of the present invention.

FIG. 2 shows further embodiments of the invention that functions as an HTS cable as also shown in FIG. 1. The device shown here is a Field Operable Superconducting Device and can function as a primary element of a Field Operable Superconducting System. FIG. 2 shows one embodiment of a 3-phase, hollow core superconducting cable 20. The cable 20 has three HTS layers 24 separated by conductive stabilizer and/or insulating layers 28. In some embodiments, cryogen flows in areas 32 and 36. In some embodiments, power elements are inserted into area 36 such as the Integrated Wound Component of a spiral wrapped ultracapacitor as a nanowhisker form of energy storage system embodiment.

Figures 3, 4, 5:
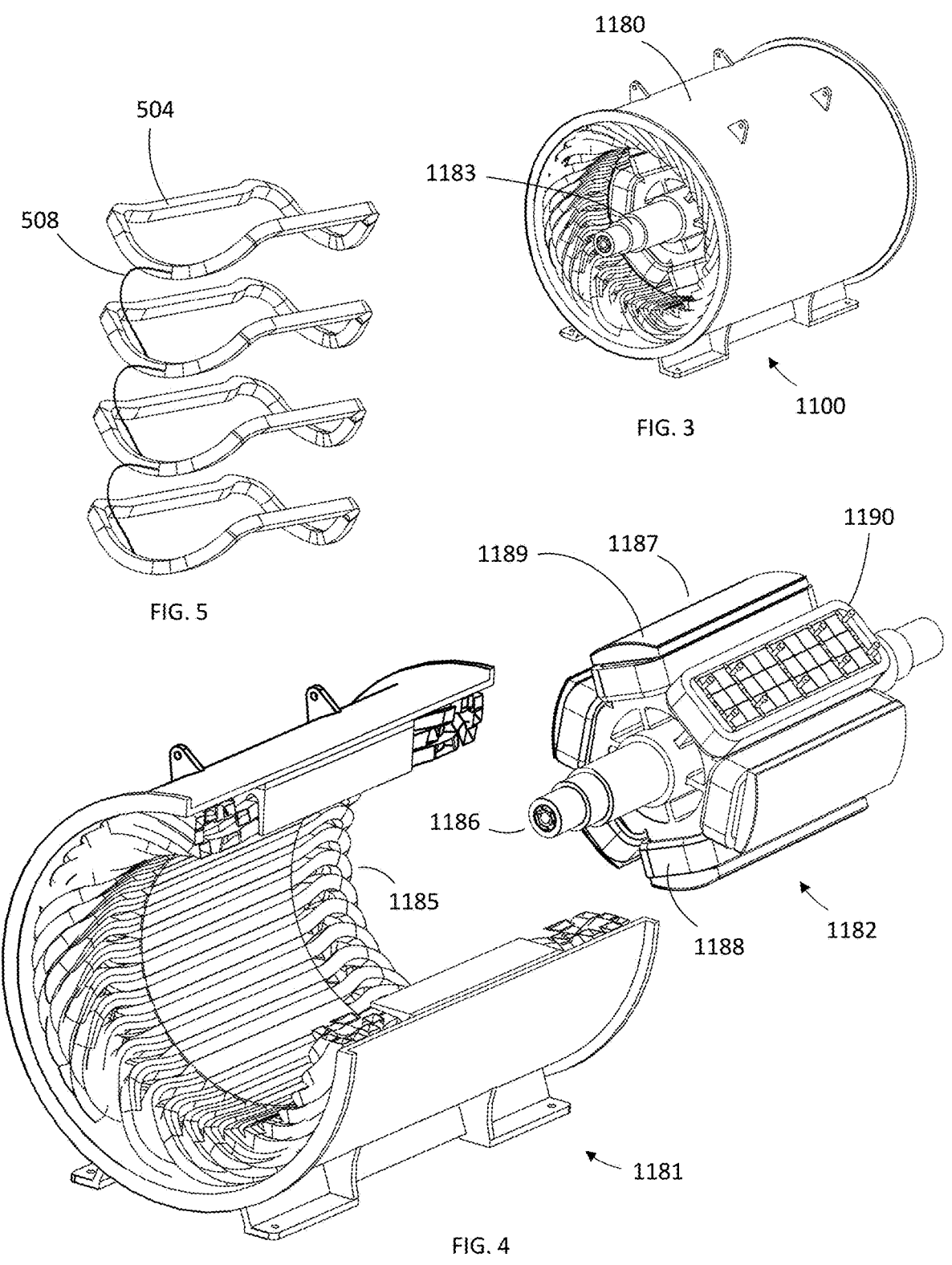
FIG. 3 is a perspective view of an a compact superconducting motor/generator of one embodiment of the present invention.
FIG. 4 is an exploded view of FIG. 3.
FIG. 5 is an exploded perspective view of magnets that can be used in a compact superconducting motor/generator of one embodiment of the present invention.

FIGS. 3-5 show a compact superconducting motor/generator 1100. The motor generator may be used in field-operable SC personal, portable devices. The machine may be half or fully HTS and, hence, half or fully cryogen cold of an electric machine (motor/generator) of any armature winding. Cryogenic cooling may be achieved by conductive cooling or a partial bath cool, where any stator cryostat is currently not shown. For simplicity of drawings, many cryogenic, armature core, etc. elements are removed or simplified. The motor/generator 1100 comprises a housing 1180 that supports a stator coils 1185, which may be of the construction of a armature coil group shown in FIG. 5 to limit splices. That is, FIG. 5 shows a plurality of magnets 504 wound together without a continuous connection of wire or tape 508 to remove or limit the number of splices. A rotor 1182 is positioned within the stator 1185. The rotor is comprised of the shaft 1186 that supports a plurality of field poles 1187.

Trapped field magnets (TFM) 1774 or permanent magnets 1190 are placed in the field poles 1767 or 1187 in groups and surrounded by the field coils 1778 or 1188. Magnetic field focusing cover 1189 provides a transient electromagnetic (EM) shield option for all field TFMs and coils. The entire field pole 1187, even if fully HTS, can be built separately and assembled as a unit into the electric machine including the option for superconducting TFM activation outside of the machine. This case of a totally cold, cryogenic, motor or generator is possible through a non-thermal conducting hollow shaft 1186, which may have a non-metal section such as the rotor bearing optional location 1183, with a rotating cryogenic coupling with embedded slip ring-based power and data cables.

A motor and/or generator type machine embodiment includes units such as any motor and/or generator use. A motor and/or generator embodiment which is personnel portable if compact enough is shown in FIGS. 3-5 where certain cryostat elements are removed to show SC coils 1185. Motor and generator embodiments range across all types of rotary and linear AC, such as synchronous and induction machines, as well as DC machines for both a hybrid to complete SC armature and/or a hybrid to complete SC active and/or passive exciter secondary or field coils where the magnetic poles range from one or a combination of individual component, wound, TFM, PM, solid pole, etc. Embodiments also include back iron or in particular a hybrid core and/or air core motor where removal of back iron allows a lighter machine and lowered frequency losses given the SC magnetics allowing a compact machine. The super-conducting machine air gap includes an evacuated or non-air air gap to remove icing of water from the air but also removes all windage loss. The air gap is the non-magnetic space between the primary and secondary of any electro-magnetic device. Motor and generator machine embodi-ments are across an extensive number of industries and applications which is too exhaustive to readily list. One embodiment is a wind or hydro turbine generator. Another embodiment is a hybrid or all electric air, land, sea, or space vehicle motor and generator including the embodiment of a partial to complete SC type motor or generator. The embodi-ment of hybrid to all electric aircraft of all types and sizes are expected to make great use of this invention by itself and in particular embodiments involving the Combined Super-conducting Magnetics and Speed invention disclosure and potentially the Hybrid Superconducting Magnetics inven-tion disclosure.

FIGS. 6-8A and 10 show an electric machine of another embodiment having hybrid or fully air core formers, and other magnetic elements placement, location, support, and operational assistance such as common to flat fan invention disclosure magnet coils, trapped field magnet (TFM) and permanent magnets, magnetic flux paths, cryostats and cryo-genic cooling and conductive paths, gas paths (e.g., cryo-genic liquid to gas expansion paths), electromagnetic (EM) shields and shield mounts. The electric machine 1750 is a compact advanced superconducting device that can function as a field operable superconducting device and can function as a primary element of a field operable superconducting system. The high magnetic flux density (B) provided by the machine 1750 allows a combined induction and synchro-nous machine. The contemplated machine is also a hybrid to air core electric machine where tape curvature and align-ment for B path is provided in all armature and field coils. Here, the air core 1754 is provided on the rotor core back area, but for any air core section non-magnetic material is used to be considered air core with respect to the magnetic flux density.

Figure 6:
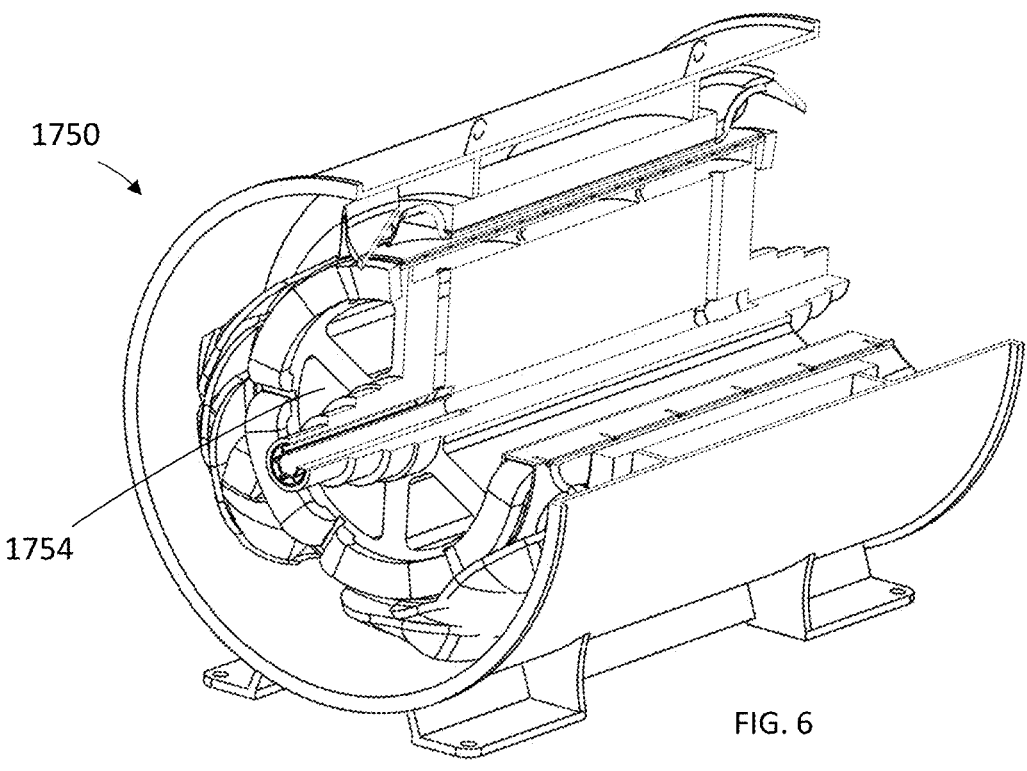
FIG. 6 is a perspective view of a fully HTS and fully cryogenically cold electric machine (motor/generator) of one embodiment of the present invention, wherein portions have been removed.
Figure 7:
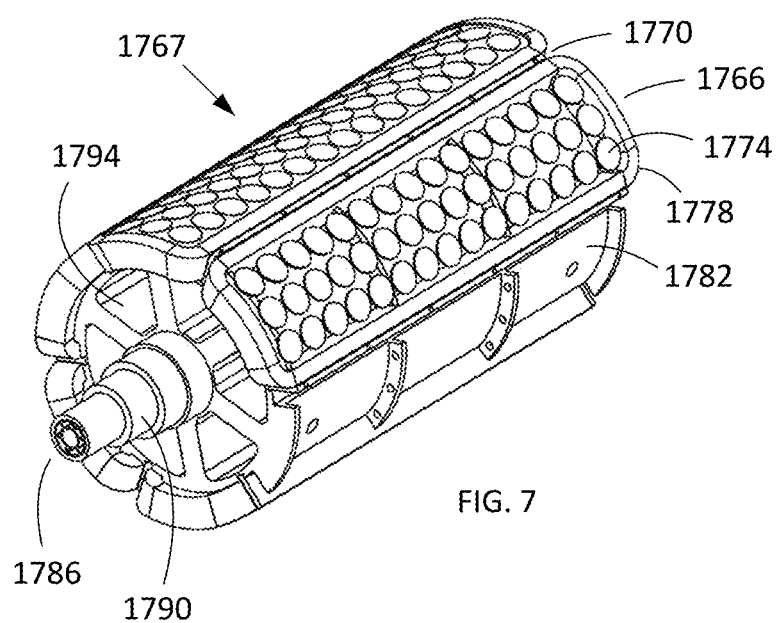
FIG. 7 is a perspective view of a rotor employed by the electric machine shown in FIG. 6.
Figures 8, 8A, 9, 10:
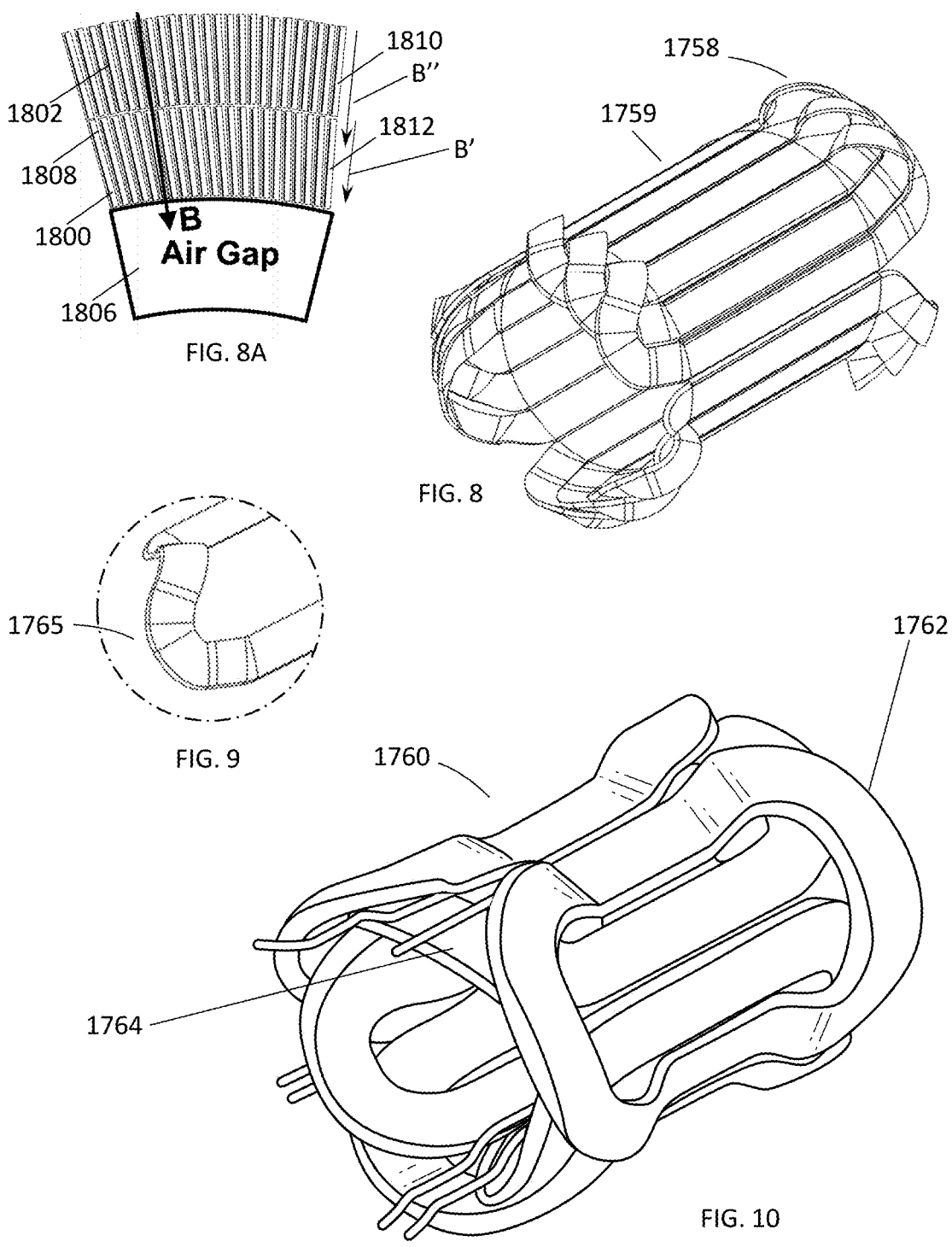
FIG. 8 is a perspective view a stator that employs high temperature superconducting elements in the form of flat fans employed by the electric machine shown in FIG. 6.
FIG. 8A is a cross-sectional taken from a plane normal to a longitudinal axis of the stator shown in FIG. 8 showing a representation of a HTS winding of one embodiment and the associated air gap.
FIG. 9 is a detailed view of FIG. 8.
FIG. 10 shows an perspective view of a an electric machine of another embodiment of the present invention that employs high temperature superconducting elements in the form of flat fans.

The armature coils 1759 are comprised of a flat fan magnetic coil with end turns 1758, where in this embodi-ment the armature is associated with the stator. Secondary coils, such as the embodiment of field coils or wound induction, may be formed as an overlapping flat fan mag-netic coil such as the secondary coils 1760. FIG. 10 shows a such a magnetic coil 1764 where the rotor coils 1760 with a rotor diameter 1764 larger than that of the stator thus placing the armature on the inside of the rotor. Of course, the magnetic coil may be inverted where the field coils are located on a smaller diameter rotor positioned within a larger diameter stator, a more common electric machine configu-ration as shown in FIGS. 3 and 6. The inversion of the primary on the outside radius and secondary on the inside radius, or vice versa, to make an electromagnetic device such as an electric machine, similarly for swapping sides of an arc or linear device, will occur to those skilled in the art. As shown in FIG. 9, the flat fan end includes a turn 1765 on the primary and (FIG. 10 shows turns 1762 on the second-ary) that can be set to add to the electric machine magnetic length, 1759 and 1764, respectively. This configuration also curves the B path and minimizes placement of HTS in the highest B regions. Complex, 3D-shaped SC magnets allow compact and lighter sizing for high efficiency and B without exceeding HTS critical values. Further, as seen in FIG. 6, the end turns are oriented such that poles can overlap end turns on one or both sides making them part of the magnetic length and, hence, part of the prime mover of the electric machine.

In this embodiment the curved flat fan coils and TFMs are both used to comprise the field poles 1766 on the rotor 1767. More specifically, the contemplated field coils may be common coils or flat fan with multi-dimensional curved sides to control the B path and further accommodate trapped field magnets (TFM), such as but not limited to HTS TFMs, to further increase the air gap B and output performance. The TFMs can be activated into different pole orientations. Specialized HTS EM shields 1189 are provided over the field poles 1766 with field pole spacers 1770, between armature phases, and over non-magnetic length end turns. In this hybrid superconducting magnetic configuration, the Trapped Field Magnets (TFM) 1774 or permanent magnets are placed in the field coils in groups with surrounding field coils 1778. The entire field pole 1766, even if fully HTS, can be built separately and assembled as a unit into the electric machine including the option for superconducting TFM activation outside of the machine. In one embodiment the field pole 1766 has a cryogen reservoir 1782 below conduc-tive cooling regions to support cryo-cooling needs. Here, a totally cold, cryogenic, motor or generator is possible through the non-thermal conducting hollow shaft 1786, which may include a non-metal section 1790, with a rotating cryogenic coupling with embedded slip ring-based power and data cable connection. An evacuated or non-air (e.g., a non-water-based gas replacement such as a noble gas, nitro-gen, cryogen cooling system gas, etc.) air gap, which could include evacuating other machine areas such as the back areas 1794, embodiment supports a fully cold electric machine by removing icing concerns while also removing windage.

FIGS. 6-8A and 10, show the application of winding sections where separately built winding sections are 3D printed, or otherwise created, separately wound, and then assembled and connected to form each magnet or each phase group of an armature core 1759. 3D printing, flat fan windings, TFM activation needs as a separate pole outside the device as well as when activating inside the device, and hybrid to air core machines separately and together make great use of this ability, such as the removal of magnetic material continuity needs.

Figure 13:
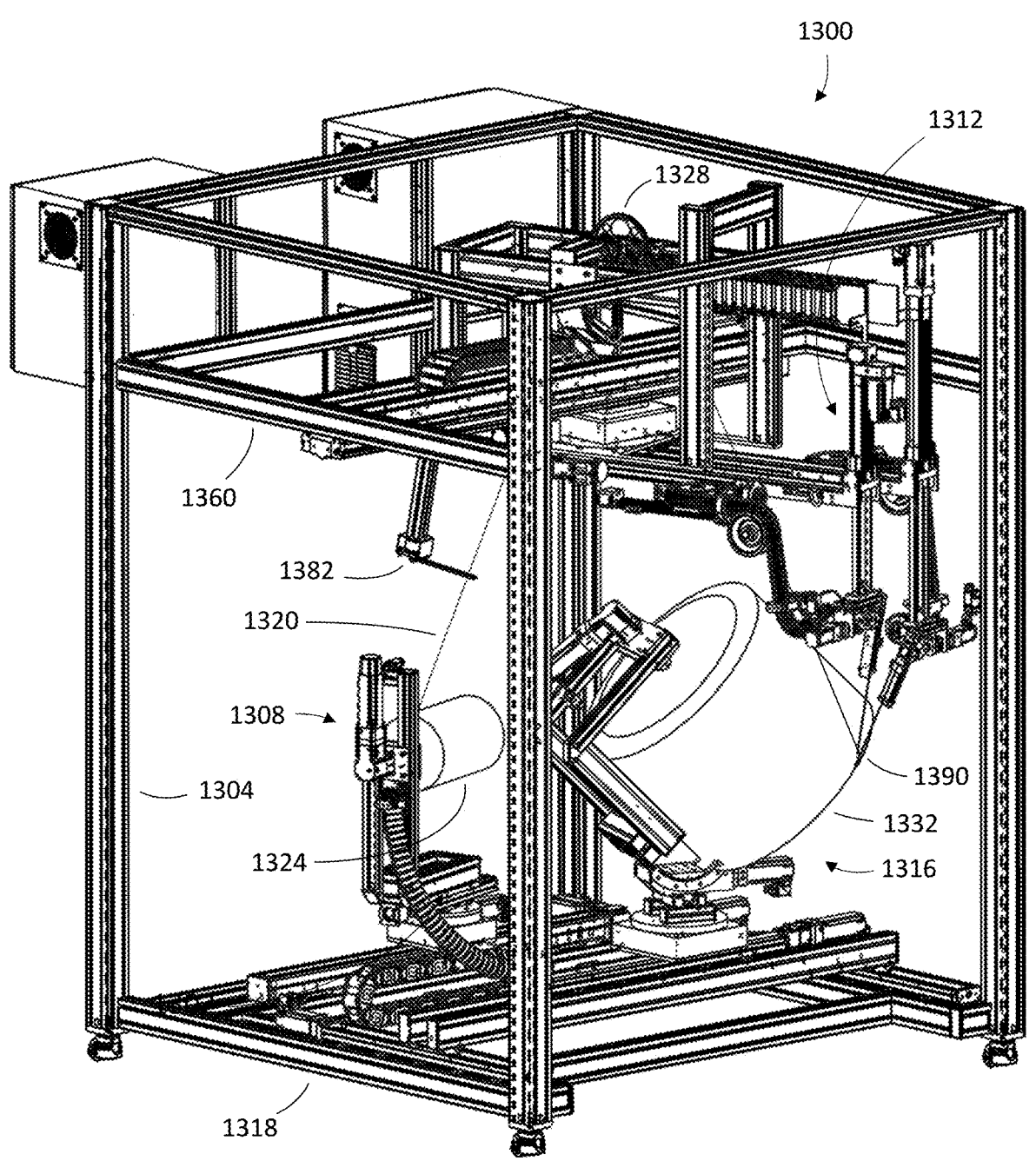
FIG. 13 is a perspective view of a winding machine of one embodiment of the present invention.
Figure 14:
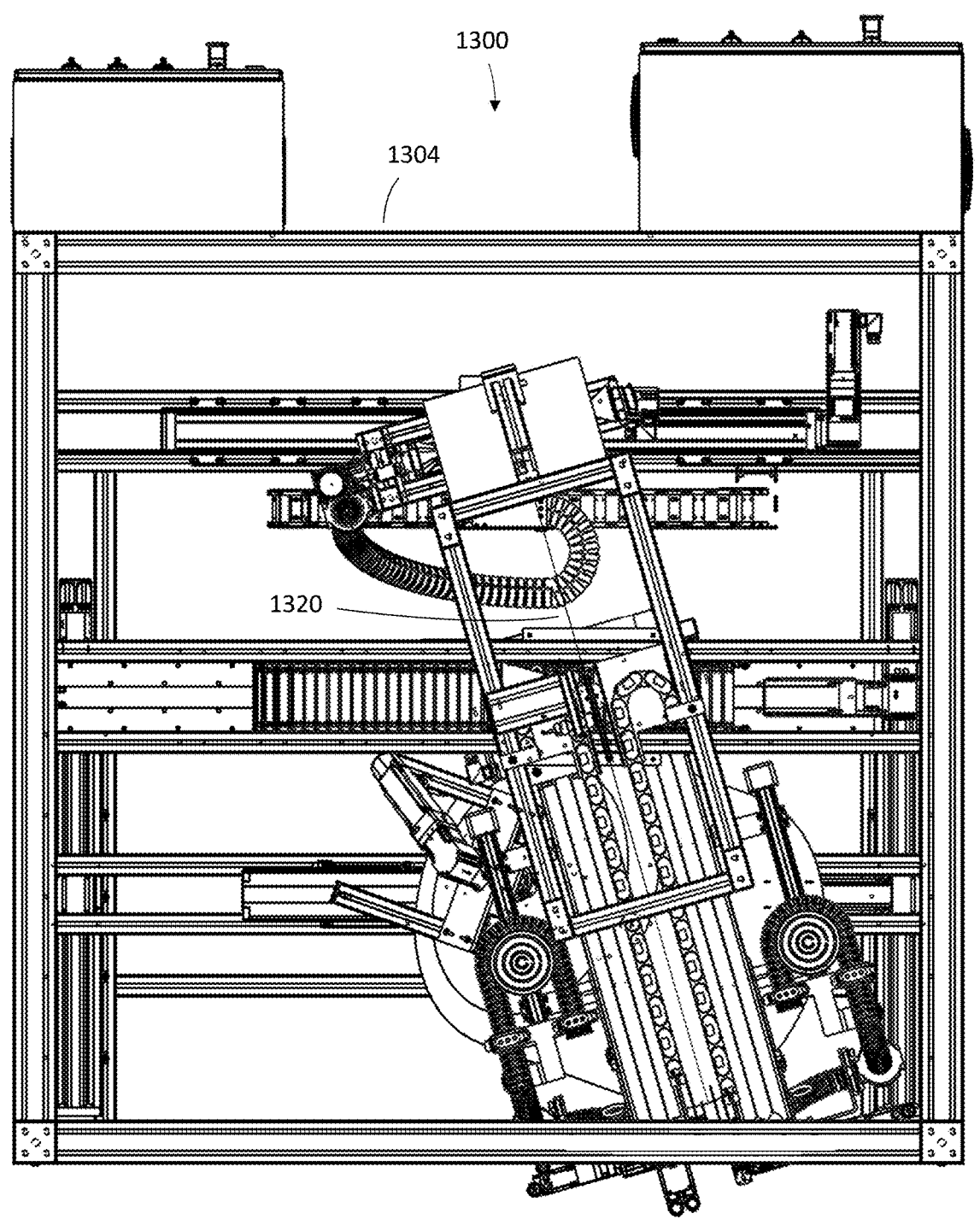
FIG. 14 is a top plan view of the winding machine shown in FIG. 13.

3D printing further provides benefits include structural, magnetic paths, EM shields, electrical paths, cooling paths, and gas to fluid paths for any purpose such as FIGS. 4 and 6. A 3D printing component embodiment is shown in FIG. 13, 1328 for a tensiometer wheel with extreme precision needs.

The contemplated flat fan coils, 1760 in FIG. 10 for a secondary embodiment and 1759 in FIG. 8 for an armature embodiment, uses a thin tape profile such as an HTS (often, 0.1 mm with 1 micrometer for HTS) by placing the HTS tape width (often, 2 to 12 mm) facing width along the straight length, like a shallow saddle coil that is densely packed and curved. B acts in a direction across the surface current, which is highest parallel to the longest length, so orienting the tape width perpendicular or close to perpendicular to the air gap gives an extremely distributed winding with the highest B across the air gap and the lowest losses. Long wind depths are no longer required versus a single (pancake), double, or, as expected, at most only a few layers winding. This is different than a common radial flux machine (i.e., the most common electric machine) where the B generation source is further into the slot of a machine and hence away from the air gap which then increases losses such as stray loss.

Embodiments of the present invention such as an induction SC electric machine employ wound secondary SC coils and/or squirrel cage configuration to obtain an high induced B and/or use HTS, such as many turns stacked or similarly in parallel, which provide an induced current path for starting torques and/or oscillation damping. Some embodiments remove damping by embedding Cu or aluminum (Al) amortisseur bars, variable external resistors, and/or the power electronics drive where any listed device can include cryogen cooling to increase performance. An embodiment of an electric machine primary is FIG. 8 with an inverted FIG. 10 orientation as the secondary if the secondary is short circuited.

FIG. 8A is a cross-sectional representation of a HTS winding of one embodiment of the present invention that generally illustrates the concepts of enhanced magnetic flux density (B) mentioned above. The HTS tape member 1800 shown includes a flat strip of superconducting material 1802, which is commonly a few μm thick. The HTS winding is shown as a plurality of HTS tape members 1800 placed such that the smallest tape dimension is directed towards an air gap 1806 provided between the primary and secondary components of an electric motor, for example. The tape members could be separated by a small gap 1808 to assist desired B flow outside of the tapes. One of skill in the art will appreciate that lateral surfaces of adjacent tape members may abut.

In one embodiment, the flat fan HTS winding includes a second layer 1810 over wrapping a first layer 1812 position adjacent to the air gap 1806. The first layer 1812 and second layer 1810 produce magnetic flux B' and B". As magnetic flux B" from the second layer 1810 cannot pass through the HTS within the tape of the first layer 1812 when it is superconducting, it must pass through gaps 1808 provided between HTS tape members as well as non-superconducting elements of the HTS tape member 1800. Accordingly, flux B" from the second layer 1810 is added to the flux B' from the first layer 1812 to define the aggregate flux B provided by the flat fan winding, which maximizes flux within the air gap 1806. Although two winding layers are shown, one of ordinary skill in the art will appreciate that additional layers may be added to increase the aggregate flux B or a single layer could also be used. Accordingly, the flat fan winding configuration contemplated herein, allows for the production of increased flux in a reduced sized component that does not suffer the drawbacks of conventional windings, e.g., flux crosstalk, magnetic field irregularities, highly separated slot or otherwise windings and all associated issues, etc. In one embodiment, current being directed to the first and second layers are controllable such that the magnetic flux provided by each layer and groups of tapes can be selectively modified One embodiment of the present invention is a combined induction and synchronous SC electric machine. The machine is similar to the induction SC electric machines described above with secondary SC coils to form an induced passive B (inductive) or active B (synchronous) type electric machine where configurations such as switching vary machine types operationally. The secondary SC coils may be shorted for an induction machine response and coils are active with or without TFMs or permanent magnets (PM) for a synchronous machine response. Oscillation damping can be controlled with embodiments such as a high B locking rotor, introduced inductance effects, external resistance with optional cryo cooling effects. Another embodiment includes variable pole options for how rotor based electrical switches close as passive inductive or active field coils.

A further embodiment that is not a compact system in the strict sense of personnel portable but is compact regarding how all elements must be as light as possible is exemplified in a spacecraft EM shield. In this case a set of large SC coils are arranged around a spacecraft providing a B shield to protect the spaceship and occupants from harmful EM radiation and ions. Although the coils are very large they assume many of the properties of compact coils such as the need to increase specific power and power density to allow a launch into and then use in space as well as long term robustness without failure. Hence all appropriate embodiments apply to this larger system.

One embodiment allows a large B in the air gap that in turn allows a higher power system including a higher speed and torque propulsion system as well as a higher energy levitation system for the combined use of maglev and magprop. One embodiment is an SC based linear motor for vehicle launch purposes such as aeronautical and aerospace (see, FIGS. 19 and 20). Another embodiment is an advanced SC such as HTS based superconducting maglev and/or magprop including commercial train speeds to high-speed vehicles beyond commercial train limits including Mach 1 or greater test sleds.

Embodiments of these hybrid magnetics include conventional magnetics to a hybrid motor and generator. In the motor and generator embodiments, SC to complete SC armature, exciter field coil, and AC induction machine passive conductor. Such embodiments of various magnetics options, in particular combining SC wound and TFM, allow not only a proper magnetic solution for a given task but in particular allow for a very compact machine.

In a motor and/or generator embodiment any magnetic type including SC combination units are held down via epoxy and/or mechanical bolts and/or dovetails and/or banding/retaining rings which increases stray losses through a larger air gap and then a different banding option is often employed such as for high-speed machines.

Historically SC bulk and wire materials are used separately across applications. The combined benefits of both are not utilized in a single unit to date.

In one embodiment a system for combining SC wire and trapped field bulk material is presented. This combination provides the ability to capture the greatest benefits of both SC formats at a common cryogenic state. Benefits include magnetic field forming to bulk material activation.

A key embodiment for any SC device is a wound SC such as a magnetic coil wound around a single or group of TFM magnets and used to both activate and then modify the field of a TFM. As a further embodiment these combined SC type poles can be created as separate units to include into the machine for ease of assembly as well as activation of the TFM outside of the SC device or in place in part or whole in the final SC device. This embodiment also allows line replaceable unit (LRU) solution.

This invention relates to methods of generating high magnetic fields from SC material for the purposes of TFM activation, high B augmentation control, and high B fields in a desired output form.

1. Superconducting (SC) wire coil and SC trapped field magnet (TFM) bulk materials are used in combination to supplement one another's SC magnetic field.
   a. The TFM can be positioned at the magnetic lower or higher points of an SC coil for enhancing or augmenting DC, AC, or pulsed field generated.
   b. TFMs places in the typical void between the SC coil sides and using both SC types in operation allows for a much higher B capability than using either a TFM or SC coil separately.
2. SC wire coil is used to augment the TFM magnetic field
   a. Readily change the magnetic flux density, B, on the SC wire with a varying static DC field change or even an AC to transient depending on the output B desired.
   b. Augmented field machines provide a wonderful machine control technique. Augmenting a uniquely high B is currently unheard of in practice.
3. Use SC wire coil to provide a high TFM material ACTIVATION energy.
   a. TFMs require high activation energies to acquire a high B. Such activation is extremely difficult to achieve. Difficulties arise from the ability to get a high B to the TFM due to reasons such as inductance path to magnetic stray and conductive shields when trying to activate external to the SC cryostat. By placing the SC wire inside of the same cryostat with the TFM bulk then one can make use of not only the high B capability of the SC wire coil but also the close proximity of the SC wire generated B to the TFM activated captured B.
   b. Utilizing an SC wire, unlike conventional a conventional conductor such as copper, the SC wire can handle an extreme current for a short period of time when devoid of pinning centers and typically generates orders of magnitudes less thermal energy than a pure conductor. Minimizing heat generation is extremely beneficial for any SC coil.
   c. The wire is automatically located inside of the cryostat whether around the entire SC bulk pack or next to individual TFMs. In the individual TFM case the coil may be located physically around the TFM or on top of the TFM center. In this case multiple SC coils may be connected in series and/or in parallel to achieve activation.
   d. Once the TFMs are activated, or when using an SC DC magnet without TFMs, the SC DC magnet can set for a steady state mode, such as a motor or generator exciter field or NMR or MRI field magnet, will theoretically never lose the DC steady state charge with the only SC loss occurring from any mostly negligible splice resistance.

e. Use secondary and primary magnet windings in an appropriate orientation to achieve increased levels of TFM activation and/or deactivation energies, times, and TFM B orientations.
4. Use SC wire coil to provide a high TFM material DEACTIVATION energy.

The same coil case of this invention may be used to also deactivate the TFM bulk materials. In this case the SC coil is purposely placed into a quench situation through means such as but not limited to forcing the SC coil(s) to quench through the external power supply or as sudden opening of a potential persistent switch for reasons such as inducing a localized heating zone.

An SC wire is able to be formed in many shapes from pure solenoids to saddle coils, yet this form always has magnetic field distributions such as high B points at the coil turns due the multiple coil legs interacting strongly in that region. A TFM is a small entity that provides a magnetically flux dense field up to the TFM saturation levels in the center areas of the TFM itself where the B distribution approximates an ice cream cone shape. This combination allows one to use the B distributions inherent to both material forms to best create a desired output field from a uniform B with a possible smoothed entering and exit pole region entering a machine air gap to lower the non-fundamental harmonic content. Such affects assist machine design to a dipole or quadrupole particle accelerator magnet where a very high but uniform B is crucial. As for a machine case the placement of TFMs into the typical void between the SC coil sides and using both the SC Coil and TFMs in parallel while in operation allows for a higher output B than either the independent SC Coil or TFM. This allows a much higher power dense machine than either an SC Coil or TFM alone.

Figure 11:
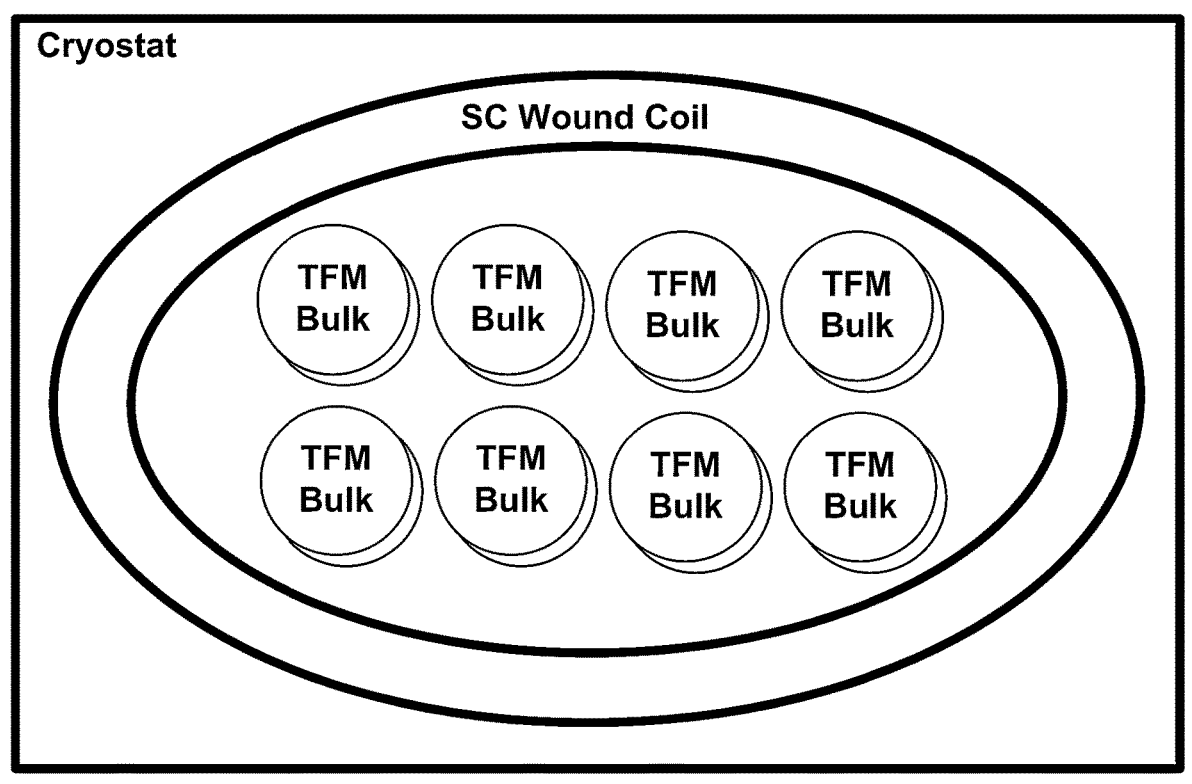
FIG. 11 shows the embodiment of an SC wound magnet around a grouping of SC bulk trapped field magnets (TFM).
Figure 12:
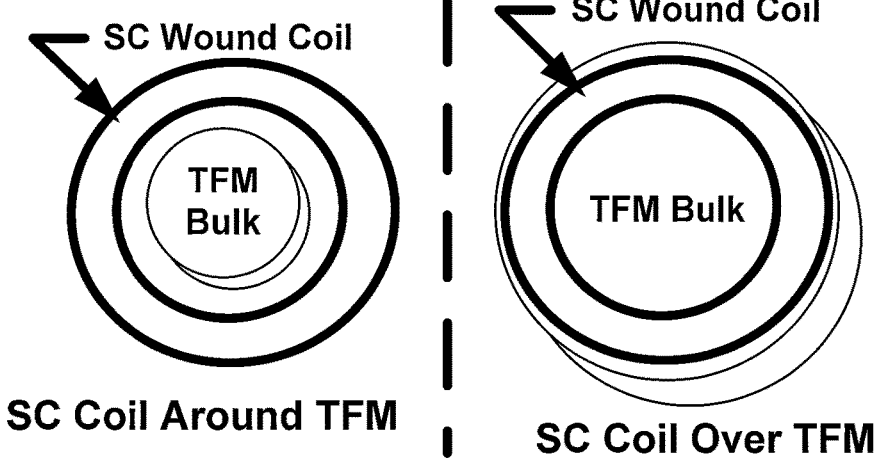
FIG. 12 shows the embodiment of an SC wound magnet around and on top of a single SC bulk trapped field magnets (TFM).

Activation and deactivation of a TFM is of extreme importance yet to date not a solved problem for a large machine. Activation techniques are complex and work on controlled B and cryogenic temperatures which may even involve controlled cryogenic pressures. To use the fact that both SC wires and SC TFM bulks must exist within an SC critical state that includes cryogenics, then one is able to readily make use of placing both SCs into the same cryostat. Using this SC coil for activation has the extreme benefit of not forcing a B pulse through a conductive cryostat wall and other supporting material as well as the SC wire generates orders of magnitudes less heat than using a typical conductor for activation. To add, by placing the TFM activation and deactivation as close to the TFM as possible, then less overall energy is required for either TFM activation or deactivation. An example of a TFM bundle with a single SC Wound Coil around the stack is provided in FIGS. 3, 4, and 11 where the removable field pole 1767, for general purposes and TFM activation, has field coil 1778 wrapping around the TFM stack 1774 and magnetic field focusing cover 1189 (not shown for TFM pole but for a PM pole here). An example of a single TFM with a dedicated and single SC Wound Coil per TFM whether around the outside of the TFM or centered on the TFM physical center is provided in FIG. 12. In this second example the dedicated TFM coils are connected in either a parallel and/or series connection to an outside power supply. In either SC coil and TFM case the SC coil and TFM materials are likely in the same cryostat but not necessarily since there are advantages to also separate the SC bulk and SC wire coils for reasons such as making use of magnetic dampers. In either SC coil and TFM case a SC persistent switch may or may not be used.

FIGS. 13-18 show LMHS, i.e., a magnet winding machine 1300 of one embodiment of the present invention capable of at least 20 degrees of freedom. The winding machine 1300 consists of a frame 1304 that supports a wind-off subassembly 1308, a follower subassembly 1312, and a wind-on subassembly 1316. The wind-off subassembly 1308 and wind-on subassembly 1316 are interconnected to the frame's base 1318. In operation, linear media 1320 travels from a wind-off spool 1324 to the follower subassembly 1312, where it engages with a tensiometer 1328. The linear media 1320 then travels to a wind-on spool 1332 of the wind-on subassembly 1316. As in the embodiments described above, handling of the linear media 1320 from the wind-off spool 1324 to the wind-on spool 1332 is carefully monitored by sensors and controlled by a plurality of linear and rotary actuators. The actuators, which will be described in further detail below, allow multiple solutions for a desired motion. The desired motion may be achieved by simultaneously moving more than one actuator in complementary directions, which allows for the winding machine's footprint to be reduced. Thus, a winding normally associated with a much larger machine is possible as motion density in the horizontal and vertical directions can be achieved.

Figure 15:
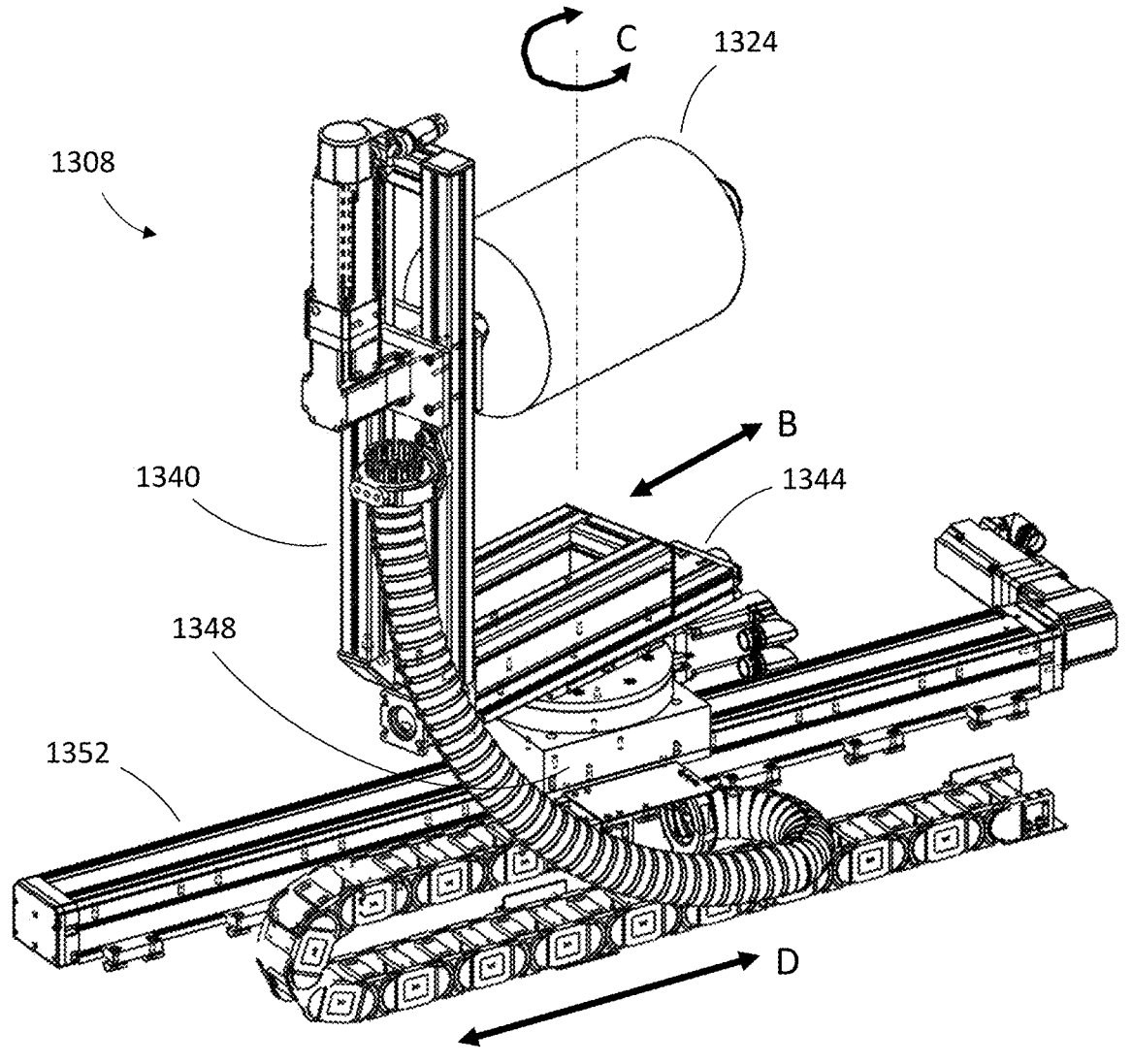
FIG. 15 is a wind-off spool subassembly of the winding machine shown in FIG. 13.

FIG. 15 shows the wind-off subassembly 1308 in detail, which comprises a frame 1340 that rotatably supports the wind-off spool 1324. In other embodiments, the wind-off spool 1324 is vertically fixed. The frame 1340 is interconnected to a linear actuator 1344 that allows movement in the direction of Arrow B. The linear actuator 1344 is interconnected to a rotary actuator 1348 that allows for the frame 1340 and interconnected wind-off spool 1324 to rotate in the direction of Arrow C. Finally, the rotary actuator 1348 is interconnected to a stationary linear actuator 1352 that allows for the frame and interconnected wind-off spool to travel in the direction of Arrow D. In some embodiments, the wind-off spool is also able to move along the wind-off frame 1340 and/or the wind-off frame 1340 can be selectively tilted to provide even more Dof. The combination of linear and rotary actuators allow for precise control of wind-off spool 1324 position, which dictates the position and orientation of the linear media's wind from point. The actuators, thus, maintain the linear media in the wind angle plane, which will be described in further detail below.

Figures 16, 17:
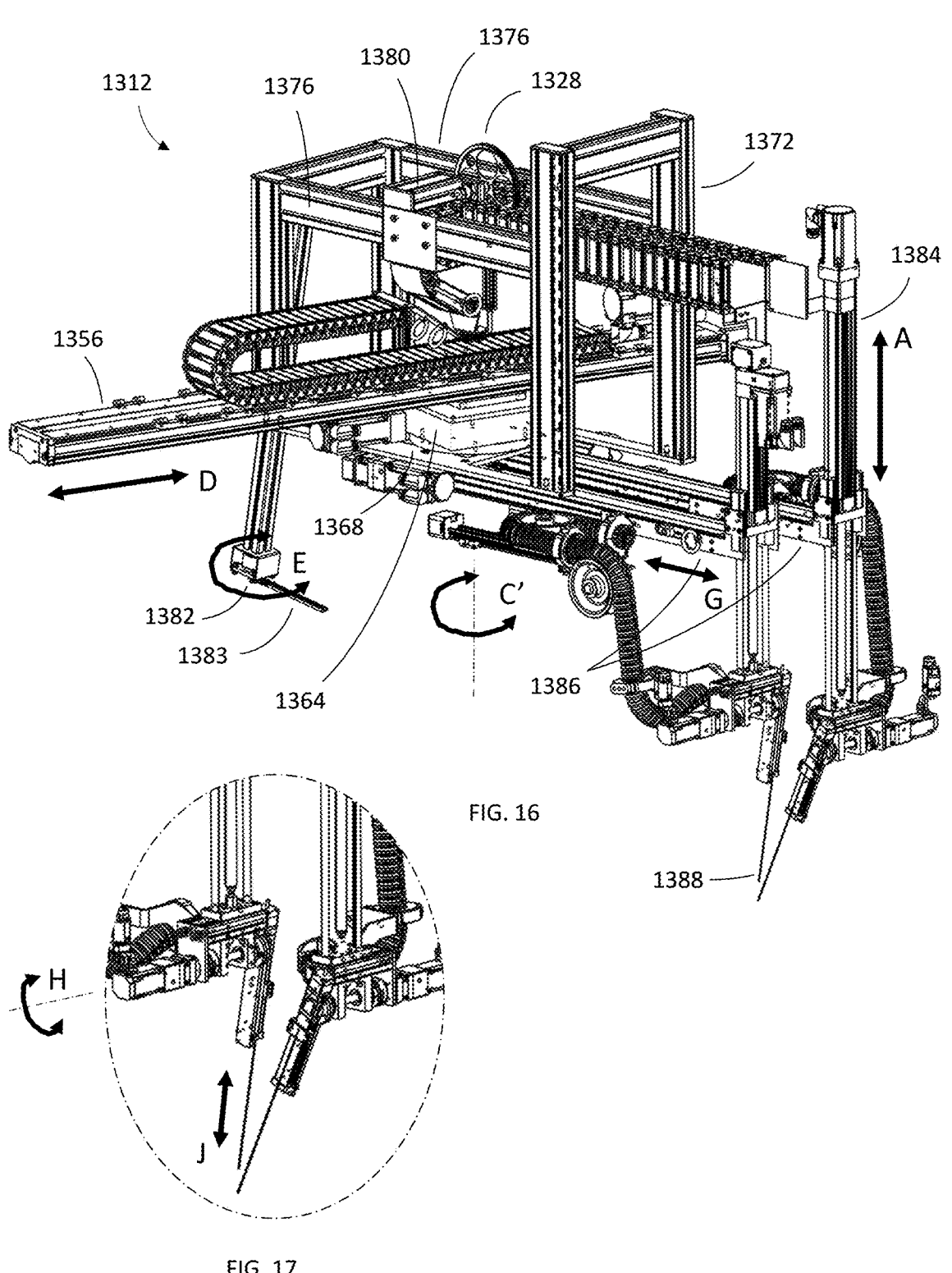
FIG. 16 is a follower subassembly of the winding machine shown in FIG. 13.
FIG. 17 is a detailed view of FIG. 16.

FIG. 16 shows the follower subassembly 1312 that operatively supports the tensiometer 1328. The follower subassembly 1312 employs a stationary linear actuator 1356 interconnected on its ends to crossbeams 1360 provided on the primary frame 1304 (see FIG. 13). In one embodiment, the stationary linear actuator 1356 is generally oriented parallel to the stationary linear actuator 1352 of the wind-off subassembly 1308. Thus, the stationary linear actuator 1356 provides movement of an interconnected rotary actuator 1364 also in the direction of Arrow D. Rotary actuator 1364 is interconnected via a plate 1368 to at least one riser 1372 that supports beams 1376. Thus, the beams 1376 are rotatable in the direction of Arrow C' when urged by the rotary actuator 1364. The tensiometer 1328 is also connected to at least one beam 1376 via support beam 1380. Various sensors may also be associated with the tensiometer and interconnected to the follower subassembly 1312 to ensure proper tensioning of the media and to provide the means for selective adjustment of tensiometer position. The follower subassembly 1312 supports a turning fork sensor 1382 that rotates in the direction consistent with Arrow E. The turning fork is comprised of parallel guides 1383 configured to operatively receive the linear media 1320. Input from the turning fork sensor 1382 is used to guide control of linear actuator 1344 in wind-off subassembly 1308.

The follower subassembly 1312 also supports linear actuators 1384 (which in one embodiment are electric cylinders) that impart selective movement of interconnected guide rods 1388 in the direction of Arrow A. These linear actuators 1384 are attached to linear actuators 1386 that selectively impart motion in the direction of Arrow G. Using combinations of actuators in follower subassembly 1312, the guide rods 1388 are moved to maintain a position on either side of a wind-on point 1390 shown in FIG. 13 and are designed to guide the linear media onto the wind-on spool.

A winding injector can be used for placement of an adhesive, UV adhesive, thermal compound, spot, linear, pattern, etc. in the wind. In one embodiment, the winding injector is mounted on the follower 1312 and used in conjunction with the follower arms 1386 and/or follower guide(s) or pusher(s), such as the guide rods 1388 of FIGS. 16 and 17 to hold for a brief dry and then wind continuation or slow wind. A drying elements such as a UV lamp for UV adhesive may be used.

As highlighted in FIG. 17, precise articulation is accomplished by a wind-on guide subassemblies that provide many degrees of freedom (DoF) that affect automated movement of the guide rod tips, which simulates human interaction and allows a wide range of control that approaches complete control of the linear media as it is taken up by the wind-on spool 1332. More specifically, the wind-on guide subassemblies 2000 are interconnected to the ends of the linear actuators 1384 and, thus, can move in the directions of Arrows A and G and rotate in the direction of Arrow C'. A guide rod rotary actuator, which is configured to impart selective rotation in the direction of Arrow H, is provided. The guide rod rotary actuator is interconnected to a guide rod linear actuator that selectively articulates the guide rod 1388 in the direction of Arrow J. One of skill in the art will appreciate that linear/rotary actuators may be added/removed or employed/disabled (if present) to hold, tilt, and extend the guide rods to provide achieve the desired linear media control.

Although referred to herein as guide "rods," those of ordinary skill in the art should appreciate that these components can be formed of various shapes. In addition, some embodiments employ a single guide, while other embodiments employ two or more guides. The guides rods 1388 may terminate in a wheel, a cone, an arcuate member, or similar device. In one embodiment, one guide contains the linear media and the other guide urges the linear media onto the wind-on spool.

Here, the tensiometer 1328 and the turning fork 1382 are located above the wind-on spool and the wind-off spool, connecting rotary motion to linear motion. By operating around the stationary linear actuator 1356, the follower subassembly 1312 minimizes vertical distance required to connect motion and sensor elements, thereby achieving high motion density in the vertical direction. motion density minimizes machine frame size and vibration amplitude, allowing the assembly to be made of lightweight aluminum extrusions instead of steel. This aspect is an important feature of one embodiment of the present invention (MMP) that supports module design of subassemblies and simplified accessory attachment.

Figure 18:
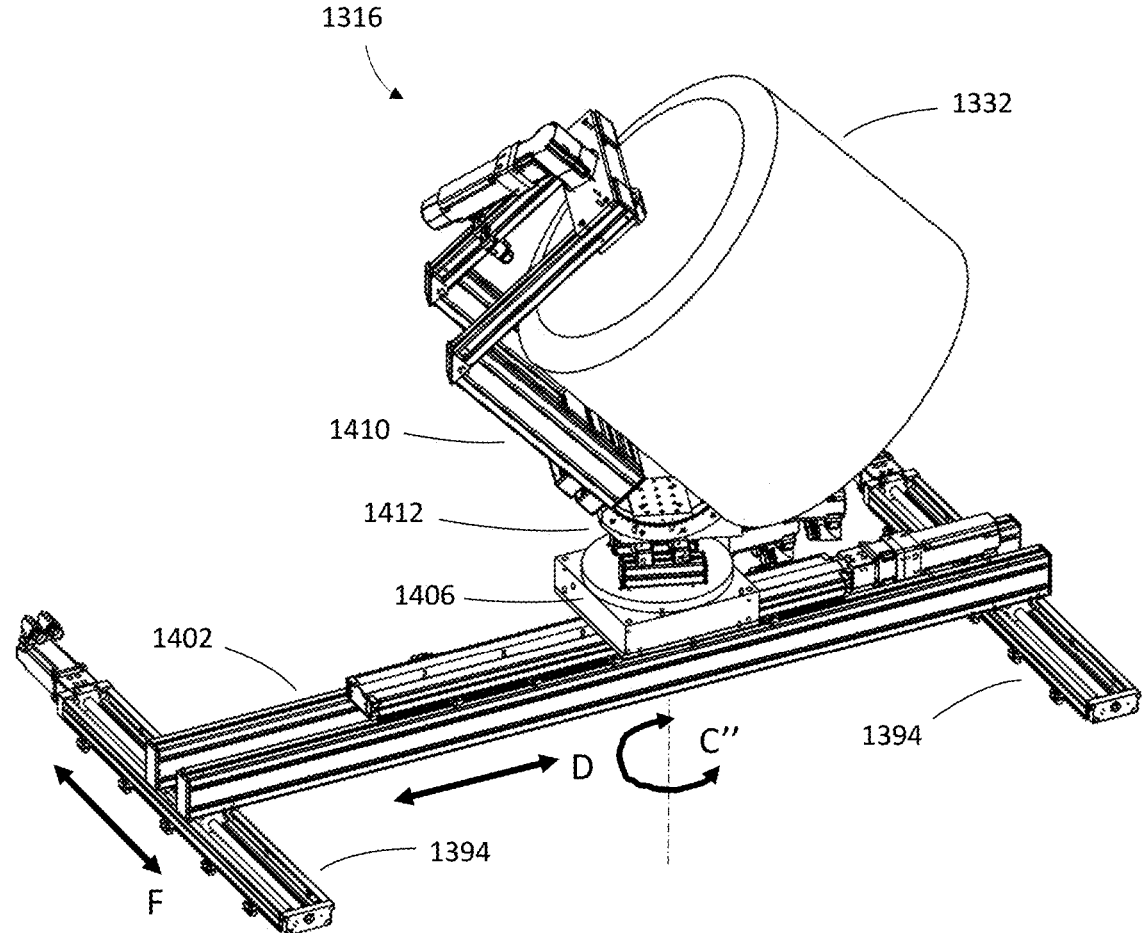
FIG. 18 is a wind-on subassembly of the winding machine shown in FIG. 13.

FIG. 18 shows the wind-on subassembly 1316 generally comprised of stationary linear actuators 1394 that interconnect to the frame base and that support another linear actuator 1402. In this example, the stationary linear actuators 1394 are orthogonal to the stationary linear actuator 1352 of the wind-off subassembly 1308. Accordingly, the stationary linear actuators 1394 allow for a rotary actuator 1406 interconnected to the linear actuator 1402 to selectively move in the directions of Arrows D and F. The rotary actuator 1406 is configured to rotate the wind-on spool along an arc indicated by Arrow C'', about an axis parallel to an axis defined by Arrow C or C'. A frame 1410 such as the rotating former here that supports the wind-on spool 1332 is interconnected to the rotary actuator 1406. In some embodiments of the present invention, the angle between the frame 1410 and the linear actuator 1402 can be selectively altered to change the orientation of the wind-on spool 1332. Some embodiments of the invention include a goniometer 1412 associated with the rotary actuator 1406 adapted to precisely guide the frame's angular orientation.

In operation, the wind-on spool 1332 is caused to move through a series of orientations conducive to producing desired wound output configuration. Operations within the wind-off subassembly and the follower subassembly support placement of the linear media at the wind-on point. Linear media 1320 is taken from the wind-off spool 1324 and directed upwardly to the tensiometer 1328. As mentioned above, the linear media 1320 is also positioned between guides 1383 of the turning fork 1382. The linear media then travels downwardly and contacts the wind-on spool 1332 at the wind-on point 1390. The guide rods 1388 control the position of the linear media as it engages the wind-on spool 1332. System control of linear and rotary actuators maintains the linear media 1320 in a wind angle plane, which is generally vertical, as shown in the FIGS. 29-32. The wind angle plane's angle is defined by the linear media's path from the wind-off spool 1324 to the wind-on spool 1332, and varies according to a desired direction of the wind-on point 1390. Again, the turning fork 1382 is aligned with the wind angle plane, and the linear media 1320 is held between the parallel guides 1383 of the turning fork 1382. Feedback from the turning fork sensor accommodates winding linear media off of a spool with axial width greater than the linear media width while maintaining the linear media path in the wind angle plane. As the wind-off point moves out of the wind angle plane, the linear media held within the turning fork guides causes it to turn and its sensor indication is used to command linear actuator 1344 to move the wind-off spool and therefore the wind-off point until the linear media and turning fork are again centered in the wind angle plane. Guiding the linear media in this way and along this path guarantees no reverse bends and allows only one bend of a minimum diameter around the tensiometer wheel 1328 before the linear media reaches the wind-on point 1390.

The linear media's formation onto the wind-on spool 1332 and all other motion in the winding machine 1300 precipitates from initially moving the wind-on spool 1332. The linear actuators 1394 and 1402 move the wind-on spool 1332 in orthogonal horizontal directions while the rotary actuator 1406 moves the wind-on spool 1332 about a vertical axis. For more complex outputs, simultaneous with other motions, winding arc rotation (i.e., selective tilting) of the wind-on spool 1332 can be accomplished by the goniometer 1412. For cylindrical arc rotation, the goniometer 1412 can be exchanged with gearing.

Some of the LMHS contemplated herein removes high and non-uniform axial tension, makes all non-axial tension negligibly small, removes all reverse bends, keeps all bends to a single and large radius, and makes all side bends negligibly small, etc., during the winding process. Side bends are especially problematic for wires that are not round such as rectangular cross sections of wire, particularly very thin by very wide to then become a tape.

For any motorized single or combination of DoF, independent or electronically geared control of linear media motion is possible through automated, partially automated, and fully manual means. This multiple degree of freedom (DoF) system will have an operator interface equivalent to providing computer aided drafting (CAD) input to computer aided manufacturing (CAM) toolpaths for computer numeric control (CNC) production. Options include a hardware joystick, a software joystick, or partially automated motion controls that allow turning on/off a single to multiple DoF for a particular move. Such ability allows the user to tune the motion for a particular need. Preferably, automated, partially automated, and/or fully manual control of any motorized single or combination of multiple DoFs is accomplished to achieve motion while accurately maintaining desired performance values such as constant axial tension. In examples described below, for example, a motorized DoF provides a continuous or changing winding pitch angle. Active control loops based on the axial tension value as the global control master and a hierarchy of master slave relationships provide the means of varying the pitch angle while accurately maintaining desired performance values such as constant axial tension. The routing design and controlled DoF of the LMHS of one embodiment provide not only a no bend situation with minimized forces but for a tape also a line over point initial contact at the wind-on location in order to further minimize stresses and bends in the linear media. This is achieved through controlled design routing and DoF control. Single winding plane with limited bends of material as well as limited stress in any direction allows a limited strain final product. The more bends and stress introduced during the magnet and cable manufacturing process, then the lower operational values allowed.

Although the description of some embodiments of the present invention above is mainly directed at a superconductor wire, tape and cable, it should be recognized that the invention could be applicable to any linear media and in particular delicate linear media. As used herein, the term "delicate linear media" will include advanced superconducting wire and tape, very fine conventional wire, filamentary linear materials, fiber optic wire, thin strands of carbon-based fiber, smart fabrics, and extremely dense fine fiber matrices. Further, the present invention can be applied not only to coil and cable winding but also to any other delicate media handling process including but not limited to media insulating, bending, braiding, forming, splicing, heat or chemical treatment such as reacting, encapsulation, inspecting, and any manual or automated process that requires handling the media safely. As used herein, the terms "wire," "tape," "cable," and "media" are used interchangeably. Some embodiments of the present invention can be applied to allow an automatic winding (or other similar) process. Also, the term "spool" is used herein to refer to any object onto which the delicate liner media is wound, regardless of the object's shape. Industry language commonly refers to a wind-off spool as "spool" and wind-on spool as "former" or "bobbin," and those terms may also be used interchangeably herein. Whenever the terms "automatic," "automated," or similar terms are used herein, those terms will be understood to include manual initiation of the automatic or automated process or step.

It should also be recognized that embodiments of the present invention can be implemented via computer hardware or software, or a combination of both. The methods can be implemented in computer programs using standard programming techniques-including a computer-readable storage medium configured with a computer program, where the storage medium so configured causes a computer to operate in a specific and predefined manner according to the methods and figures described in this Specification. Each program may be implemented in a high level procedural or object-oriented programming language to communicate with a computer system. However, the programs can be implemented in assembly or machine language, if desired. In any case, the language can be a compiled or interpreted language. Moreover, the program can run on dedicated integrated circuits programmed for that purpose.

Further, methodologies may be implemented in any type of computing platform, including but not limited to, personal computers, mini-computers, main-frames, workstations, networked or distributed computing environments, computer platforms separate, integral to, or in communication with charged particle tools or other imaging devices, and the like. Aspects of the present invention may be implemented in machine readable code stored on a storage medium or device, whether removable or integral to the computing platform, such as a hard disc, optical read and/or write storage mediums, RAM, ROM, and the like, so that it is readable by a programmable computer, for configuring and operating the computer when the storage media or device is read by the computer to perform the procedures described herein. The invention described herein includes these and other various types of computer-readable storage media when such media contain instructions or programs for implementing the steps described above in conjunction with a microprocessor or other data processor. The invention also includes the computer itself when programmed according to the methods and techniques described herein.

Figure 19:
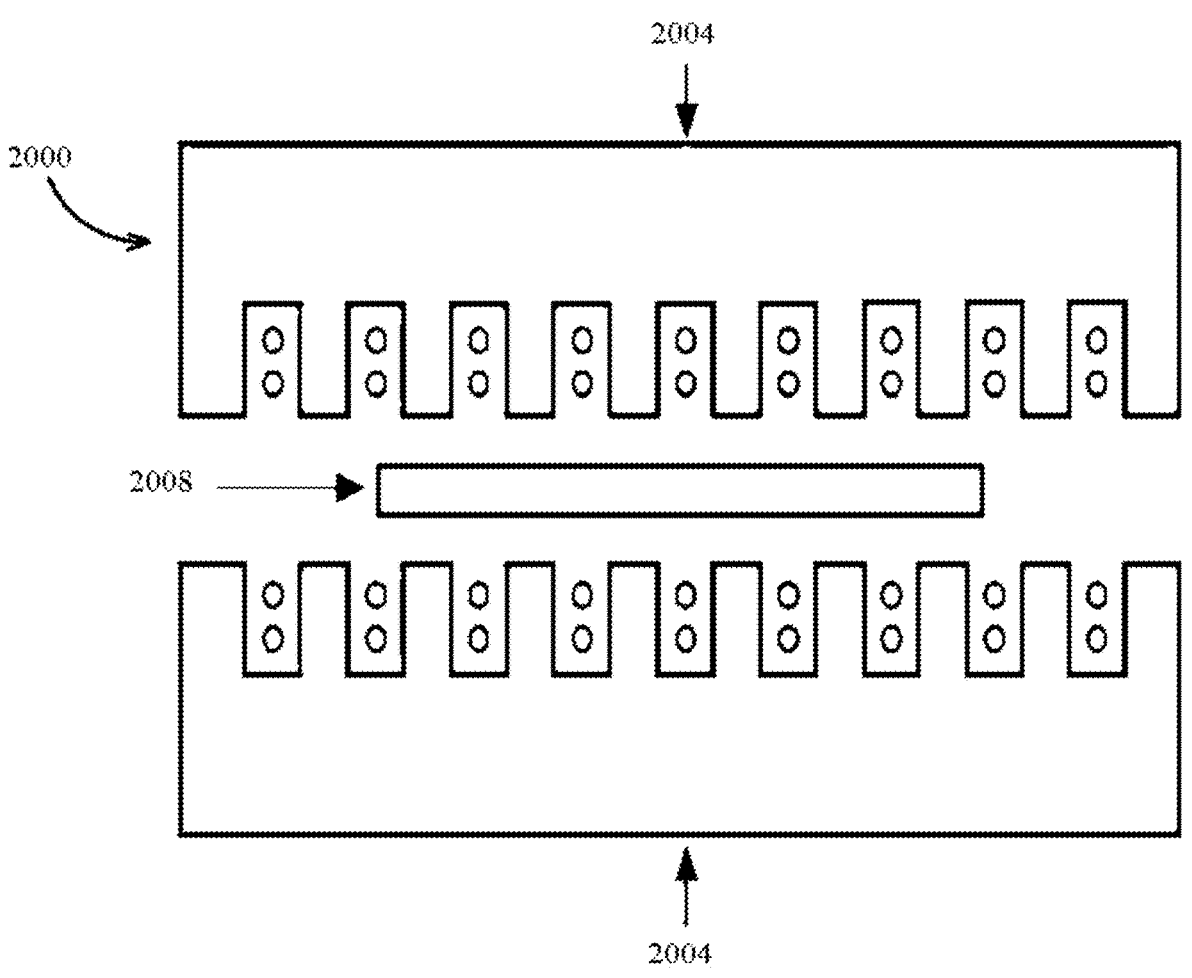
FIG. 19 is a schematic of a common linear motor.
Figure 20:
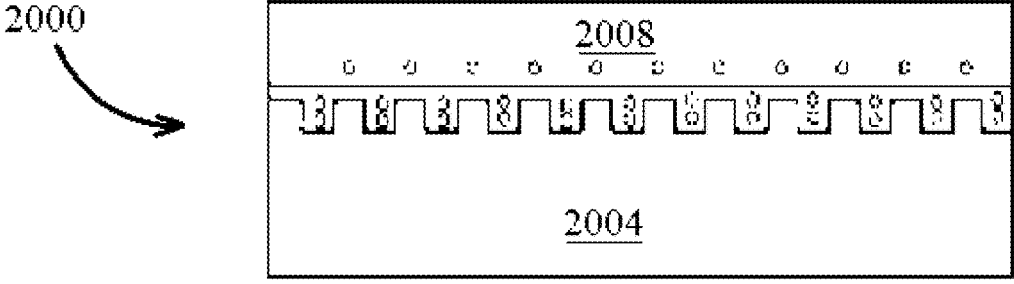
FIG. 20 is schematic of another common linear motor

FIGS. 19 and 20 show linear motors 2000 of some embodiments of the present invention that are generally comprised of a primary component 2004 and a secondary component 2008.

The invention has broad applicability and can provide many benefits as described and shown in the examples above. The embodiments will vary greatly depending upon the specific application, and not every embodiment will provide all the benefits and meet all of the objectives that are achievable by the invention. In the previous discussion and in the claims, the terms "including" and "comprising" are used in an open-ended fashion, and thus should be interpreted to mean "including, but not limited to . . . " To the extent that any term is not specially defined in this specification, the intent is that the term is to be given its plain and ordinary meaning. The accompanying drawings are intended to aid in understanding the present invention and, unless otherwise indicated, are not drawn to scale.

While various embodiments of the present invention have been described in detail, it is apparent that modifications and alterations of those embodiments will occur to those skilled in the art. It is to be expressly understood that such modifications and alterations are within the scope and spirit of the present invention, as set forth in the following claims. Further, it is to be understood that the invention(s) described herein is not limited in its application to the details of construction and the arrangement of components set forth in the preceding description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising,"

or "having" and variations thereof herein is meant to encompass the items listed thereafter and equivalents thereof as well as additional items.

Exemplary characteristics of embodiments of the present invention have been described. However, to avoid unnecessarily obscuring embodiments of the present invention, the preceding description may omit several known apparatus, methods, systems, structures, and/or devices one of ordinary skill in the art would understand are commonly included with the embodiments of the present invention. Such omissions are not to be construed as a limitation of the scope of the claimed invention. Specific details are set forth to provide an understanding of some embodiments of the present invention. It should, however, be appreciated that embodiments of the present invention may be practiced in a variety of ways beyond the specific detail set forth herein.

Modifications and alterations of the various embodiments of the present invention described herein will occur to those skilled in the art. It is to be expressly understood that such modifications and alterations are within the scope and spirit of the present invention, as set forth in the following claims. Further, it is to be understood that the invention(s) described herein is not limited in its application to the details of construction and the arrangement of components set forth in the preceding description or illustrated in the drawings. That is, the embodiments of the invention described herein are capable of being practiced or of being carried out in various ways. The scope of the various embodiments described herein is indicated by the following claims rather than by the foregoing description. And all changes which come within the meaning and range of equivalency of the claims are to be embraced within their scope. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The foregoing disclosure is not intended to limit the invention to the form or forms disclosed herein. In the foregoing Detailed Description, for example, various features of the invention are grouped together in one or more embodiments for the purpose of streamlining the disclosure. This method of disclosure is not to be interpreted as reflecting an intention that the claimed inventions require more features than expressly recited. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention. Further, the embodiments of the present invention described herein include components, methods, processes, systems, and/or apparatus substantially as depicted and described herein, including various sub-combinations and subsets thereof. Accordingly, one of skill in the art will appreciate that would be possible to provide for some features of the embodiments of the present invention without providing others. Stated differently, any one or more of the aspects, features, elements, means, or embodiments as disclosed herein may be combined with any one or more other aspects, features, elements, means, or embodiments as disclosed herein.

What is claimed is:

1. An electric machine, comprising:
a primary component comprising a plurality of magnetic coils;
a secondary component having at least one coil, the secondary component positioned adjacent to the primary component and separated from the primary component by an air gap, the air gap being substantially devoid of filler material, wherein the primary component configured to create an electromagnetic force that interacts with the secondary component to move the secondary component;

wherein the plurality of magnetic coils comprise a first layer of superconducting tape having a rectangular cross section defined by long edges and corresponding first and second short edges, wherein first short edges are located near an outer extent of the air gap, wherein the long edges extend away from the outer extent of the air gap with second short edges spaced from the air gap, and wherein lateral side surfaces of the superconducting tape, which are defined by the long edges, are spaced from each other;

wherein the plurality of magnetic coils comprise a second layer of superconducting tape having a rectangular cross section defined by long edges and corresponding first and second short edges, wherein first short edges are located near the short edges of the first layer of superconducting tape, and wherein lateral side surfaces of the superconducting tape, which are defined by the long edges, are spaced from each other; and wherein the first layer of superconducting tape produces a first magnetic flux and the second layer of superconducting tape produces a second magnetic flux, the second magnetic flux passing through spaces between the lateral side surfaces of the first layer of superconducting tape and/or lateral side surfaces of the second layer of superconducting tape, wherein the second magnetic flux is superimposed upon the first magnetic flux to define an aggregate flux; and wherein lateral side surfaces defined by the long edges are not normal to the curvature of the outer extent of the gap.

2. The machine of claim 1, wherein the at least one coil of the secondary component includes embedded copper or aluminum, amortisseur bars, variable external resistors, and/or power electronics.

3. The machine of claim 1, wherein the secondary component is positioned within the primary component.

4. The machine of claim 1, wherein the secondary component further employs a plurality of permanent magnets or trapped field magnets that interact with a magnetic field generated by the primary component.

5. The machine of claim 4, wherein magnetic flux provided by the trapped field magnets and/or the magnetic flux generated by the secondary and/or primary component can be selectively altered.

6. The machine of claim 1, wherein the at least one coil of the secondary component is comprised of at least one layer of superconducting tape.

7. The machine of claim 6, wherein the layers of superconducting tape of the primary or secondary component are comprised of a plurality of magnets wound together with continuous connections.

8. The machine of claim 6, wherein the layer of superconducting tape of the secondary component has a rectangular cross section defined by long edges and corresponding short edges, a first short edge located near an outer extent of the air gap, wherein the long edges extend away from the outer extent of the air gap.

9. The machine of claim 6, wherein the primary component and secondary component are maintained at superconducting temperatures.

10. The machine of claim 1, wherein the at least one coil of the secondary component is comprised of at least one layer of superconducting tape;

wherein the layer of superconducting tape of the secondary component has a rectangular cross section defined by long edges and corresponding short edges, first short edges located near an outer extent of the air gap, wherein the long edges extend away from the outer extent of the air gap;

wherein the at least one layer of superconducting material of the secondary component is comprised of a third layer of superconducting material and a fourth layer of superconducting material, the fourth layer of superconducting material located outside the third layer of superconducting material, wherein the third layer of superconducting material is located between the air gap and the fourth layer of superconducting material;

wherein lateral side surfaces defined by the long edges of the superconducting tape of the third layer are spaced from each other, and lateral side surfaces defined by the long edges of the superconducting tape of the fourth layer are spaced from each other;

wherein the first layer of superconducting tape produces a first magnetic flux and the second layer of superconducting tape produces a second magnetic flux, the second magnetic flux passing through spaces between the lateral side surfaces of the first layer of superconducting tape and/or lateral side surfaces of the second layer of superconducting tape, wherein the second magnetic flux is superimposed upon the first magnetic flux to define a first aggregate flux; and wherein the third layer of superconducting tape produces a third magnetic flux and the fourth layer of superconducting tape produces a fourth magnetic flux, the fourth magnetic flux passing through spaces between the lateral side surfaces of the third layer of superconducting tape and/or lateral side surfaces of the fourth layer of superconducting tape, wherein the fourth magnetic flux is superimposed upon the third magnetic flux to define a second aggregate flux.

11. The machine of claim 1, wherein the secondary component is a rotor comprised of a shaft that supports a plurality of field poles comprised of trapped field magnets, permanent magnets, and/or the at least one coil.

12. The machine of claim 11, further comprising electromagnetic shields covering the trapped field magnets, permanent magnets, and/or the at least one coil.

13. The machine of claim 12, wherein the electromagnetic shields are HTS tapes in any orientation.

14. The machine of claim 11, wherein the shaft is at least partially hollow, rotor bearings, and a rotating cryogenic coupling with embedded slip ring that accommodates power and data cables.

15. The machine of claim 1, wherein the air gap is comprised of a vacuum.

16. The machine of claim 1, wherein the secondary component is a rotor that spins up to at least 100 rpm when urged by a magnetic field generated by the primary component or by an external mechanical force.

17. The electric machine of claim 1, wherein current directed to the first layer of superconducting material and current directed to the second layer of superconducting material are controllable wherein the first magnetic flux and second magnetic flux can be selectively modified.

18. The machine of claim 1, wherein the layer of superconducting tape is comprised of high temperature superconducting material that is between about 0.1 mm with 1 micrometer thick and between about 2 to 12 mm wide.

19. The machine of claim 1, wherein the primary component and the secondary component comprise linear portions located side-by-side.

20. An electric machine, comprising:

a primary component comprising a plurality of superconducting coils;

a secondary component positioned adjacent to the primary component, the secondary component entirely separated from the primary component by an air gap; and wherein the plurality of superconducting coils comprise a first layer of superconducting tape having a rectangular cross section defined by long edges and corresponding first and second short edges, wherein first short edges are located near an outer extent of the air gap, wherein the long edges extend away from the outer extent of the air gap with second short edges spaced from the air gap, and wherein lateral side surfaces of the superconducting tape, which are defined by the long edges, are spaced from each other;

wherein the plurality of superconducting coils comprise a second layer of superconducting tape having a rectangular cross section defined by long edges and corresponding first and second short edges, wherein first short edges are located near the second short edges of the first layer of superconducting tape, and wherein lateral side surfaces of the superconducting tape, which are defined by the long edges, are spaced from each other; and wherein the first layer of superconducting tape produces a first magnetic flux and the second layer of superconducting tape produces a second magnetic flux, the second magnetic flux passing through spaces between the lateral side surfaces of the first layer of superconducting tape and/or lateral side surfaces of the second layer of superconducting tape, wherein the second magnetic flux is superimposed upon the first magnetic flux to define an aggregate flux; and wherein a portion of the lateral side surfaces are not normal to the curvature of the outer extent of the air gap.

21. The machine of claim 20, wherein the secondary component is positioned within the primary component.

22. The machine of claim 20, wherein the secondary component employs a plurality of permanent magnets, trapped field magnets, superconducting tape, bars, or coils that interact with a magnetic field generated by the primary component.

23. The machine of claim 22, wherein magnetic flux provided by the trapped field magnets and/or the magnetic flux generated by the secondary and/or primary component can be selectively altered.

24. The machine of claim 20, wherein the secondary component is a rotor comprised of a shaft that supports a plurality of field poles comprised of trapped field magnets, permanent magnets, and/or at least one coil.

25. The machine of claim 24, further comprising electromagnetic shields covering the trapped field magnets, permanent magnets, and/or at least one coil.

26. The machine of claim 25, wherein the electromagnetic shields are HTS tapes in any orientation.

27. The machine of claim 24, wherein the shaft is at least partially hollow, rotor bearings, and a rotating cryogenic coupling with embedded slip ring that accommodates power and data cables.

28. The machine of claim 20, wherein the air gap is devoid of filler material and consists of a vacuum.

29. The machine of claim 20, wherein the secondary component is a rotor that spins up to at least 100 rpm when urged by a magnetic field generated by the primary component or by an external mechanical force.

30. The machine of claim 20, wherein the plurality of superconducting coils comprise:

a first superconducting coil comprising a first elongated portion and a second elongated portion, first ends of which are interconnected by a first end turn, and second ends of which are interconnected by a second end turn, the first elongated portion is further defined by a first lateral side and a second lateral side, and the second elongated portion is further defined by a third lateral side and a fourth lateral side;

a second superconducting coil comprising a third elongated portion and a fourth elongated portion, first ends of which are interconnected by a third end turn, and second ends of which are interconnected by a fourth end turn, the third elongated portion is further defined by a fifth lateral side and a sixth lateral side, and the second elongated portion is further defined by a seventh lateral side and an eighth lateral side;

a third superconducting coil comprising a fifth elongated portion and a sixth elongated portion, first ends of which are interconnected by a fifth end turn, and second ends of which are interconnected by a sixth end turn, the fifth elongated portion is further defined by a ninth lateral side and a tenth lateral side, and the sixth elongated portion is further defined by an eleventh lateral side and a twelfth lateral side wherein the second lateral side engages the fifth lateral side, the sixth lateral side engages the ninth lateral side, the tenth lateral side engages the third lateral side, the fourth lateral side engages the seventh lateral side, and the eighth lateral side engages the eleventh lateral side, to define slotless engagements between the first superconducting coil, the second superconducting coil, and the third superconducting coil; and wherein the first end turn, second end turn, third end turn, fourth end turn, fifth end turn, and sixth end turn have bends configure to allow portions of the first end turn and third end turn, portions of the third end turn and fifth end turn, portions of the second end turn and fourth end turn, and portions of the fourth end turn and sixth end turn to selectively interconnect.

31. The machine of claim 30, wherein the first end turn, second end turn, third end turn, fourth end turn, fifth end turn, and sixth end turn increase an effective magnetic length of the first elongated portion, the second elongated portion, the third elongated portion, the fourth elongated portion, the fifth elongated portion, and/or the sixth elongated portion.

32. The machine of claim 20, wherein the primary component and the secondary component have linear portions that are located side-by-side.

33. A method of controlling an electric machine comprising a primary component and a secondary component separated from the primary component by an air gap, the primary component comprising at least one superconducting coil formed of a layer of superconducting tape having a rectangular cross section defined by a long edges and corresponding short edges, first short edges located near an outer extent of the air gap, wherein the long edges extend away from the outer extent of the air gap;

wherein the at least one superconducting coil comprises:

a first layer of superconducting tape having a rectangular cross section defined by long edges and corresponding first and second short edges, wherein first short edges are located near an outer extent of the air gap, wherein the long edges extend away from the outer extent of the air gap with second short edges spaced from the air gap, and wherein lateral side surfaces of the superconducting tape, which are defined by the long edges, are spaced from each other;

a second layer of superconducting tape having a rectangular cross section defined by long edges and corresponding first and second short edges, wherein first short edges are located near the second short edges of the first layer of superconducting tape, and wherein lateral side surfaces of the superconducting tape, which are defined by the long edges, are spaced from each other; and wherein the first layer of superconducting tape produces a first magnetic flux and the second layer of superconducting tape produces a second magnetic flux, the second magnetic flux passing through spaces between the lateral side surfaces of the first layer of superconducting tape and/or lateral side surfaces of the second layer of superconducting tape, wherein the second magnetic flux is superimposed upon the first magnetic flux to define an aggregate flux;

wherein a portion of the lateral side surfaces are not normal to the curvature of the outer extent of the air gap; and initially energizing the primary component to create a magnetic field that interacts with the secondary component to begin rotation of the secondary component.

34. The method of claim 33, wherein the secondary component further comprises at least one of a conductor of a coil or bar, superconducting tape, a permanent magnet, and a trapped field magnet.

35. The method of claim 34, wherein the secondary component is comprised of a superconducting coil that has a passive mode of use and an active mode of use where current passes therethrough, and wherein the superconducting coil is in the passive mode of use when the primary component is initially energized.

36. The method of claim 34, wherein a magnetic field density of the trapped field magnets is set by the primary component and/or the superconducting coil of the secondary component.

37. The method of claim 33, wherein energizing the at least one superconducting coil occurs when rotation speed of the secondary component approaches a predetermined rate.

38. The method of claim 33, wherein current directed to the first layer of superconducting material and current directed to the second layer of superconducting material are controllable wherein the first magnetic flux and second magnetic flux can be selectively modified.

39. An electric machine, comprising:

a primary component comprising a plurality of magnetic coils;

a secondary component having at least one coil, the secondary component positioned adjacent to the primary component and separated from the primary component by a gap, the primary component configured to create an electromagnetic force that interacts with the secondary component to move the secondary component;

wherein the plurality of magnetic coils comprise a first layer of superconducting tape having a rectangular cross section defined by long edges and corresponding first and second short edges, wherein first short edges are located near an outer extent of the gap, wherein the long edges extend away from the outer extent of the gap with second short edges spaced from the gap, and wherein lateral side surfaces of the superconducting tape, which are defined by the long edges, are spaced from each other;

wherein the plurality of magnetic coils comprise a second layer of superconducting tape having a rectangular cross section defined by long edges and corresponding first and second short edges, wherein first short edges are located near the short edges of the first layer of superconducting tape, and wherein lateral side surfaces of the superconducting tape, which are defined by the long edges, are spaced from each other; and wherein the first layer of superconducting tape produces a first magnetic flux and the second layer of superconducting tape produces a second magnetic flux, the second magnetic flux passing through spaces between the lateral side surfaces of the first layer of superconducting tape and/or lateral side surfaces of the second layer of superconducting tape, wherein the second magnetic flux is superimposed upon the first magnetic flux to define an aggregate flux, wherein the plurality of magnetic coils comprise:

a first magnetic coil comprising a first elongated portion and a second elongated portion, first ends of which are interconnected by a first end turn, and second ends of which are interconnected by a second end turn, the first elongated portion is further defined by a first lateral side and a second lateral side, and the second elongated portion is further defined by a third lateral side and a fourth lateral side;

a second magnetic coil comprising a third elongated portion and a fourth elongated portion, first ends of which are interconnected by a third end turn, and second ends of which are interconnected by a fourth end turn, the third elongated portion is further defined by a fifth lateral side and a sixth lateral side, and the second elongated portion is further defined by a seventh lateral side and an eighth lateral side;

a third magnetic coil comprising a fifth elongated portion and a sixth elongated portion, first ends of which are interconnected by a fifth end turn, and second ends of which are interconnected by a sixth end turn, the fifth elongated portion is further defined by a ninth lateral side and a tenth lateral side, and the sixth elongated portion is further defined by an eleventh lateral side and a twelfth lateral side wherein the second lateral side engages the fifth lateral side, the sixth lateral side engages the ninth lateral side, the tenth lateral side engages the third lateral side, the fourth lateral side engages the seventh lateral side, and the eighth lateral side engages the eleventh lateral side, to define slotless engagements between the first magnetic coil, the second magnetic coil, and the third magnetic coil; and wherein the first end turn, second end turn, third end turn, fourth end turn, fifth end turn, and sixth end turn have bends configured to allow portions of the first end turn and third end turn, portions of the third end turn and fifth end turn, portions of the second end turn and fourth end turn, and portions of the fourth end turn and sixth end turn to selectively interconnect.

40. The machine of claim 39, wherein the first end turn, second end turn, third end turn, fourth end turn, fifth end turn, and sixth end turn increase an effective magnetic length of the first elongated portion, the second elongated portion, the third elongated portion, the fourth elongated portion, the fifth elongated portion, and/or the sixth elongated portion.

\* \* \* \* \*